United States Patent
Takeuchi et al.

(10) Patent No.: US 11,966,514 B2
(45) Date of Patent: Apr. 23, 2024

(54) TACTILE PRESENTATION DEVICE

(71) Applicant: Shanghai Tianma Micro-Electronics Co., Ltd., Shanghai (CN)

(72) Inventors: Shin Takeuchi, Kanagawa (JP); Hiroshi Haga, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/991,633

(22) Filed: Nov. 21, 2022

(65) Prior Publication Data

US 2023/0168739 A1    Jun. 1, 2023

(30) Foreign Application Priority Data

Nov. 29, 2021   (JP) ................. 2021-192976

(51) Int. Cl.
  *G06F 3/043* (2006.01)
  *G06F 3/01* (2006.01)
(52) U.S. Cl.
  CPC .................. *G06F 3/016* (2013.01)
(58) Field of Classification Search
  None
  See application file for complete search history.

(56) References Cited

U.S. PATENT DOCUMENTS

| 2011/0115734 A1 | 5/2011 | Harashima et al. |
| 2018/0052567 A1* | 2/2018 | Miyamoto ........... G06F 3/0484 |
| 2020/0081542 A1 | 3/2020 | Akabane et al. |

FOREIGN PATENT DOCUMENTS

JP    2017-049829 A    3/2017

* cited by examiner

*Primary Examiner* — Carl Adams
(74) *Attorney, Agent, or Firm* — Sughrue Mion, PLLC

(57) ABSTRACT

A tactile presentation device includes a panel, a first supporting member that secures and supports a first end of the panel, a vibration generator disposed at a position facing the first supporting member across a target area to be touched by a user on the panel, and a driving control device that provides the vibration generator with a driving signal. The driving control device makes only the vibration generator vibrate to form a standing wave in an area including the target area between the vibration generator and the first end. A first vibration reflection rate at the first end for a carrier wave from the vibration generator is negative. A second vibration reflection rate for the carrier wave from the vibration generator at a second end of the panel that is opposing to the first end across the vibration generator is greater than the first vibration reflection rate.

10 Claims, 15 Drawing Sheets

TACTILE PRESENTATION DEVICE

CROSS-REFERENCE TO RELATED APPLICATIONS

This non-provisional application claims priority under 35 U.S.C. § 119(a) on Patent Application No. 2021-192976 filed in Japan on Nov. 29, 2021, the entire content of which is hereby incorporated by reference.

BACKGROUND ART

The present invention relates to a tactile presentation device.

In recent years, electronic devices equipped with a touch panel such as a smartphone or GPS are widely used. When a user operates an object such as an icon included in a user interface displayed via a touch panel, the electronic device activates the function corresponding to the object.

The entire surface of the touch panel is hard, and regardless of the area of the touch panel user's finger touches, the user feels the same texture. Against this background, a technique is known where feedback is provided to a user to make them perceive the presence of an object, or perceive that the operation to activate a function corresponding to the object has been accepted. In this technique, tactile feedback is presented to the finger touching the surface, by making the surface of the touch panel vibrate.

SUMMARY

An aspect of this disclosure is a tactile presentation device. The tactile presentation device includes a panel, a first supporting member that secures and supports a first end of the panel, a vibration generator disposed at a position facing the first supporting member across a target area to be touched by a user on the panel, and a driving control device that provides the vibration generator with a driving signal. The driving control device makes only the vibration generator vibrate to form a standing wave in an area including the target area between the vibration generator and the first end. A first vibration reflection rate at the first end for a carrier wave from the vibration generator is negative. A second vibration reflection rate for the carrier wave from the vibration generator at a second end of the panel that is opposing to the first end across the vibration generator is greater than the first vibration reflection rate.

It is to be understood that both the foregoing general description and the following detailed description are exemplary and explanatory and are not restrictive of this disclosure.

DETAILED DESCRIPTION OF THE EMBODIMENTS

Figure 1A:
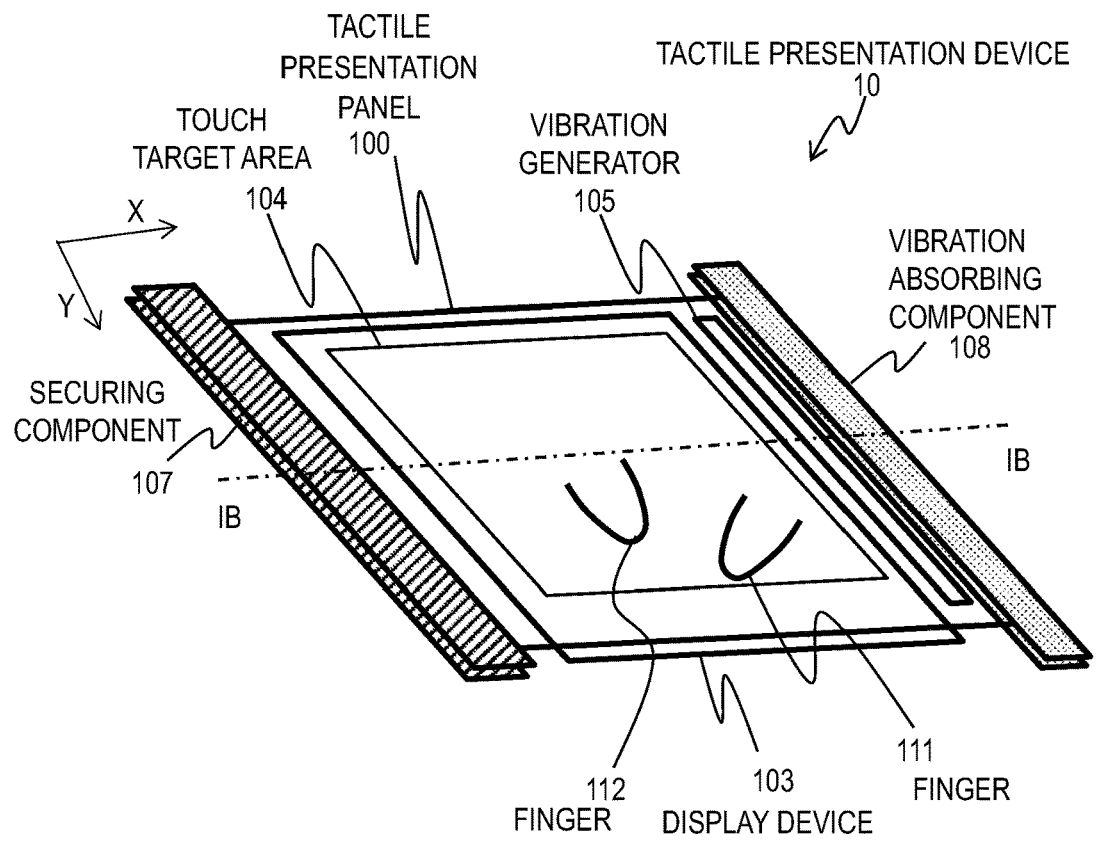
FIG. 1A is a perspective view of the tactile presentation device.

Hereinafter, embodiments of this disclosure will be described with reference to the accompanying drawings. It should be noted that the embodiments are merely examples to implement this disclosure and are not to limit the technical scope of this disclosure. Some elements in the drawings are exaggerated in size or shape for clear understanding of the description.

Below, a tactile presentation device that presents tactile feedback to a pointing body touching a panel such as a finger will be explained. In some tactile presentation devices, it is required to present tactile feedback only when a specific area on the panel is touched, but not when any other areas are touched. For example, in a display device with a touch panel, a menu area indicating options to be selected by a user and a background area are sometimes displayed together.

When the user touches one of the options, a system performs the process corresponding to the touched option. In this configuration, the system presents tactile feedback in the option area, but not in the background area. In this example, an area indicating an option and an area not indicating an option can sometimes be touched at the same time by different fingers. In this case, the system is required to present tactile feedback to the finger touching the option area, but not to the finger touching the background area.

An image displayed on the display device does not necessarily stay the same. When the displayed image changes, the option area presenting tactile feedback and the background area not presenting tactile feedback can also change. Among a plurality of fingers touching the touch surface at the same time, the position of the finger that is given tactile feedback and the position of the finger that is not given tactile feedback do not stay the same. Thus, it might be necessary to control the position at which tactile feedback is presented and the position at which tactile feedback is not presented, depending on the positions of the touching fingers.

The tactile presentation device of one embodiment of the present specification includes, on a panel, a vibration generator and a supporting part that face each other across a tactile presentation area. There are no other vibration generators present between this vibration generator and the supporting part. A carrier wave from the vibration generator forms, in the tactile presentation area, a standing wave having a node near the supporting part. The tactile presentation device can control the position of the nodes of the standing wave by controlling the frequency of the vibration generator. The tactile presentation device can present tactile feedback at a touch position selected from a plurality of touch positions on the panel, by controlling the position of nodes of the standing wave.

<Device Configuration>

Figure 1B:
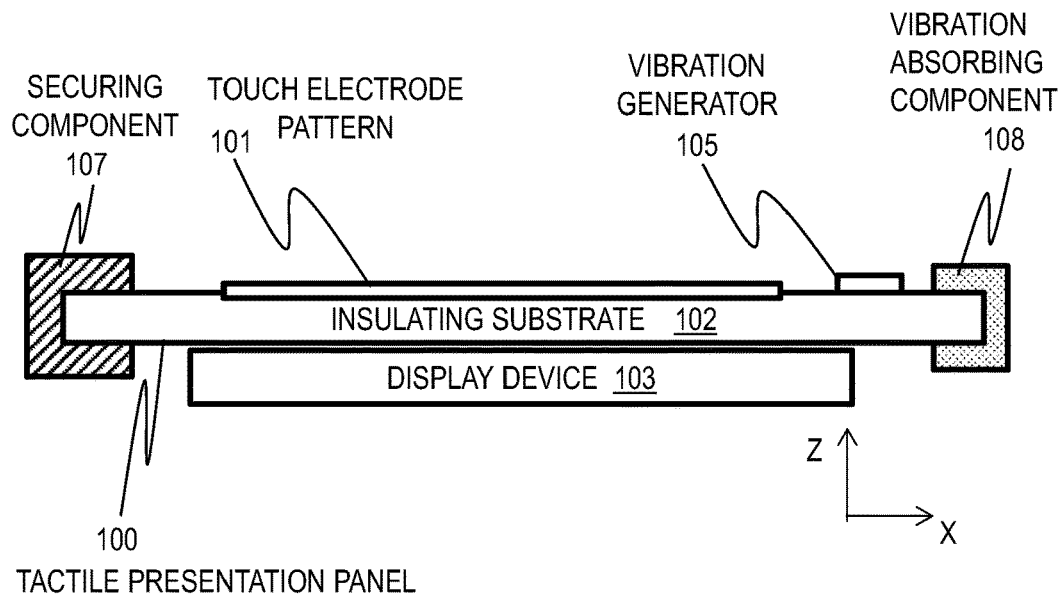
FIG. 1B is a cross-sectional view of the tactile presentation device at the IB-IB line in FIG. 1A.

FIGS. 1A and 1B schematically illustrate a configuration example of a tactile presentation device 10 according to one embodiment of the present specification. FIG. 1A is a perspective view of the tactile presentation device 10, and FIG. 1B is a cross-sectional view of the tactile presentation device 10 at the IB-IB line in FIG. 1A. In FIGS. 1A and 1B, a driving control device that drives and controls the tactile presentation device 10 is not shown.

The tactile presentation device 10 presents a user with UIs (user interface) including at least one object (image), and accepts an operation via those UIs. In addition, the tactile presentation device 10 presents tactile feedback to the user so the user can perceive the operation of the object included in the UI. The respective components of the tactile presentation device 10 illustrated in FIGS. 1A and 1B are stored in an appropriate case, for example.

The tactile presentation device 10 includes a tactile presentation panel 100 and a display device 103. As illustrated in FIG. 1A, a touch target area 104 is present on the surface of the tactile presentation panel 100. The touch target area 104 is an area to be touched by the user, and a tactile presentation area where tactile feedback is presented. In the touch target area 104, the position at which tactile feedback is actually presented (area with tactile presentation) and the position at which tactile presentation is not presented (area with no tactile presentation) can dynamically change.

Below, for ease of explanation, a pointing body that touches the tactile presentation panel 100 is a finger. In FIG. 1A, different positions in the touch target area 104 are touched at the same time by two fingers 111 and 112.

As illustrated in FIG. 1B, the tactile presentation panel 100 includes an insulating substrate 102 formed of glass or resin, and a touch electrode pattern 101 formed on the insulating substrate 102. The tactile presentation panel 100 doubles as a touch panel. The touch electrode pattern 101 allows for detection of the position of user's finger touching the touch surface, which is the front surface of the touch electrode pattern 101. Part or all of the touch electrode pattern 101 is included in the touch target area 104.

The touch electrode pattern 101 allows for detection of the position on the tactile presentation panel 100 touched by a pointing body. The touch detection by the touch electrode pattern 101 may use any appropriate methods, including the resistive method, the surface capacitive method, or the projected capacitive method.

On the rear side (back side) of the tactile presentation panel 100, the display device 103 is disposed. Below, the side facing a user of the tactile presentation panel 100 will be referred to as the front side. The opposite side of the font side will be referred to as the rear side or back side.

The display device 103 displays UI images each including an object in the touch target area 104. The display device 103 may be of any appropriate type, and examples thereof include an OLED (organic light-emitting diode) display device, a liquid crystal display device, or a micro-LED display device.

The tactile presentation device 10 includes a securing component 107 that secures the first end of the tactile presentation panel 100, and a vibration absorbing component 108 attached to the second end facing the first end. The securing component 107 directly touches the first end, and secures and supports the first end such that the carrier wave (carrier vibration) on the surface of the tactile presentation panel 100 substantially develops fixed end reflection at the first end. The securing component 107 may be made of resin or metal, for example, but not limited thereto.

The vibration absorbing component 108 touches the second end, and has viscoelasticity such that the carrier wave on the surface of the tactile presentation panel 100 can be absorbed to a greater extent and reflection wave can be attenuated to a greater extent at the second end. The absorption rate of the carrier wave at the vibration absorbing component 108 is greater than that of the securing component 107, and the absolute value of the reflection rate of the carrier wave at the second end is smaller than that of the first end. The elastic modulus of the vibration absorbing component 108 is smaller than that of the securing component 107, and the viscosity of the vibration absorbing component 108 is smaller than that of the securing component 107. The second end is supported by a supporting component (not shown) through the vibration absorbing component 108. The vibration absorbing component 108 may be made of rubber, elastomer, or resin, but not limited thereto. The vibration absorbing component 108 may be made of a material with viscoelasticity, or the viscoelasticity may be realized by the structure thereof.

The vibration generator 105 is disposed between the vibration absorbing component 108 and the touch target area 104. The vibration generator 105 generates vibration, which makes the surface of the touch target area 104 vibrate, thereby presenting tactile feedback to the pointing body touching the surface.

In the configuration example of FIGS. 1A and 1B, the vibration generator 105 is the only device that makes the tactile presentation panel 100 vibrate for tactile presentation. Any other vibrating element (vibration generating element) is not installed in the touch target area 104 or the area between the securing component 107 and the touch target area 104. The vibration generator 105 may include one or more vibration generating elements.

In this configuration example, the tactile presentation panel 100 is in a rectangular shape. The securing component 107 is attached to one straight side of the tactile presentation panel 100, and the vibration absorbing component 108 is attached to the opposing side. The vibration generator 105 is constituted of one vibration generating element, and extends along the side of the touch target area 104. The vibration generator 105 is disposed at the position facing the securing component 107 across the touch target area 104.

The vibration generator 105 is a piezoelectric device, for example, and vibrates in the direction perpendicular to the primary surface of the tactile presentation panel 100. The vibration generator 105 may vibrate in any way as long as a standing wave is formed between the vibration generator 105 and the securing component as described below. The vibration generator 105 may be implemented by placing a pre-fabricated device on the insulating substrate 102, or may be directly formed on the insulating substrate 102 by the thin-film forming process.

As described below, a standing wave in the form of stripes can be formed between the vibration generator 105 and the securing component 107 by the vibration of the vibration generator 105. The end secured by the securing component 107 is a fixed end, and becomes a node of the standing wave. The fixed end is also a reflection end that reflects the carrier wave. The amplitude of the standing wave is along the direction perpendicular to the primary surface of the tactile presentation panel (Z-axis direction in FIG. 1B). For example, nodes and antinodes alternately appear in the direction from the securing component 107 toward the vibration generator 105 (X-axis direction in FIG. 1A). The nodes and antinodes extend along the extending direction of the securing component 107 (Y-axis direction in FIG. 1A). The pattern of the standing wave may be determined by design.

When the frequency of the vibration generator 105 changes, the positions of the nodes and antinodes of the standing wave change. Thus, by controlling the frequency of the vibration generator 105, it is possible to control the position (area) at which tactile feedback is presented and the position (area) at which tactile feedback is not presented in the touch target area 104.

Figure 2:
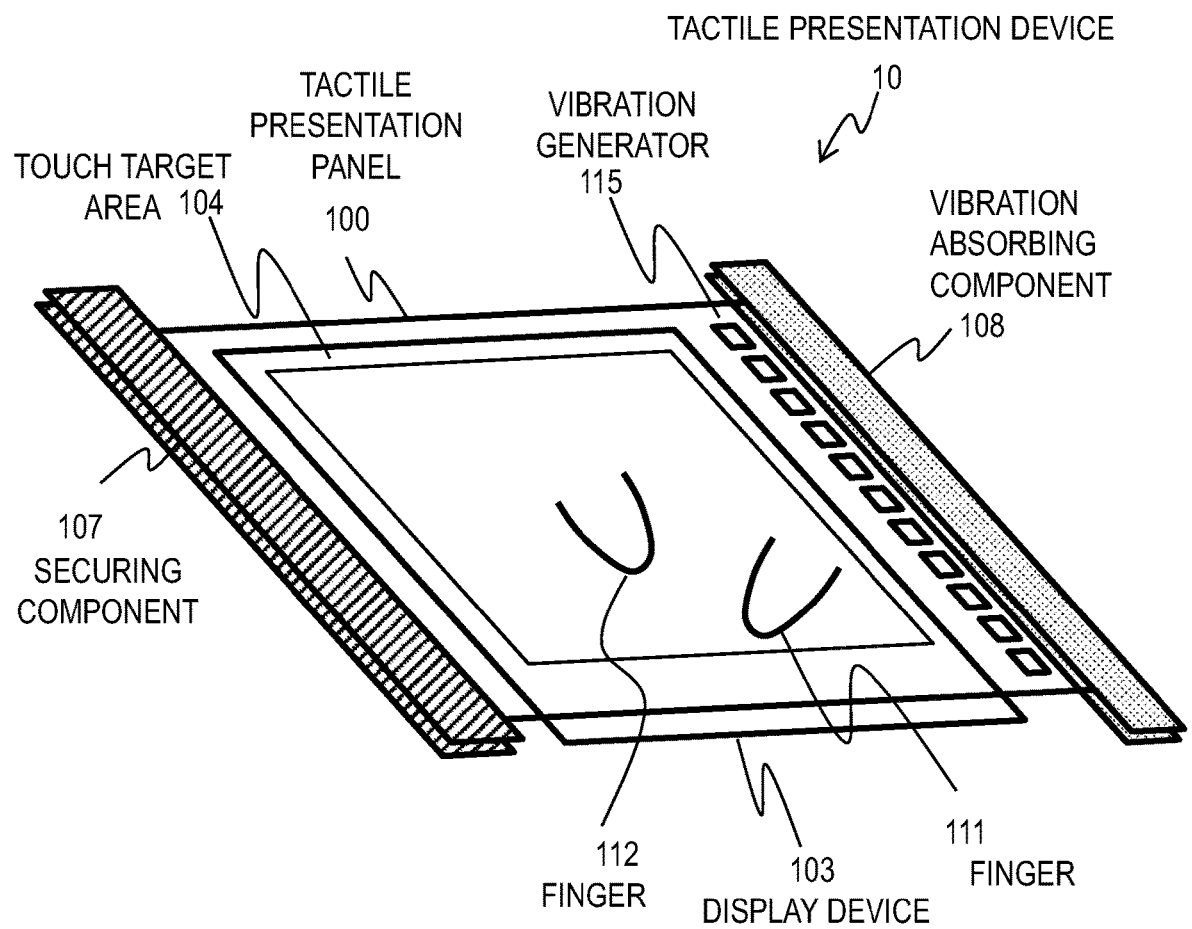
FIG. 2 schematically illustrates a configuration example of the tactile presentation device according to one embodiment of the present specification.

FIG. 2 schematically illustrates a configuration example of the tactile presentation device 10 according to one embodiment of the present specification. This configuration example differs from the configuration example of FIG. 1A in the structure of a vibration generator 115. In the configuration example of FIG. 2, the vibration generator 115 is constituted of a plurality of vibration generating elements arranged between the vibration absorbing component 108 and the touch target area 104. This way, even when only small vibration generating elements are available, a desired standing wave can be formed in the entire touch target area 104. The plurality of vibration generating elements are driven to vibrate in the same manner as each other (the same frequency, amplitude, and phase), for example.

As described above, by securing and supporting one end of the tactile presentation panel with the securing component, disposing the vibration absorbing component at the opposing end and disposing the vibration generator near the opposing end, a stable standing wave with an appropriate wavelength corresponding to the frequency of the vibration generator can be generated in the area on the surface of the tactile presentation panel between the vibration generator and the securing component.

In a standing wave, there are positions with greater amplitude and positions with smaller amplitude, and thus, by generating a standing wave having a greater amplitude at the position at which tactile feedback is presented and a smaller amplitude at the position at which tactile feedback is not presented, it is possible to present tactile feedback only to one of the fingers touching the panel at the same time. The opposing end does not necessarily have to have a vibration absorbing component, and the opposing end may be an open free end. As described later, by placing an absorbing component at the opposing end, or by making the opposing end open, it is possible to generate a more stable standing wave as compared with the case in which the opposing end is directly supported by a securing component in the same manner as the other end.

<Driving Control Configuration>

Figure 3:
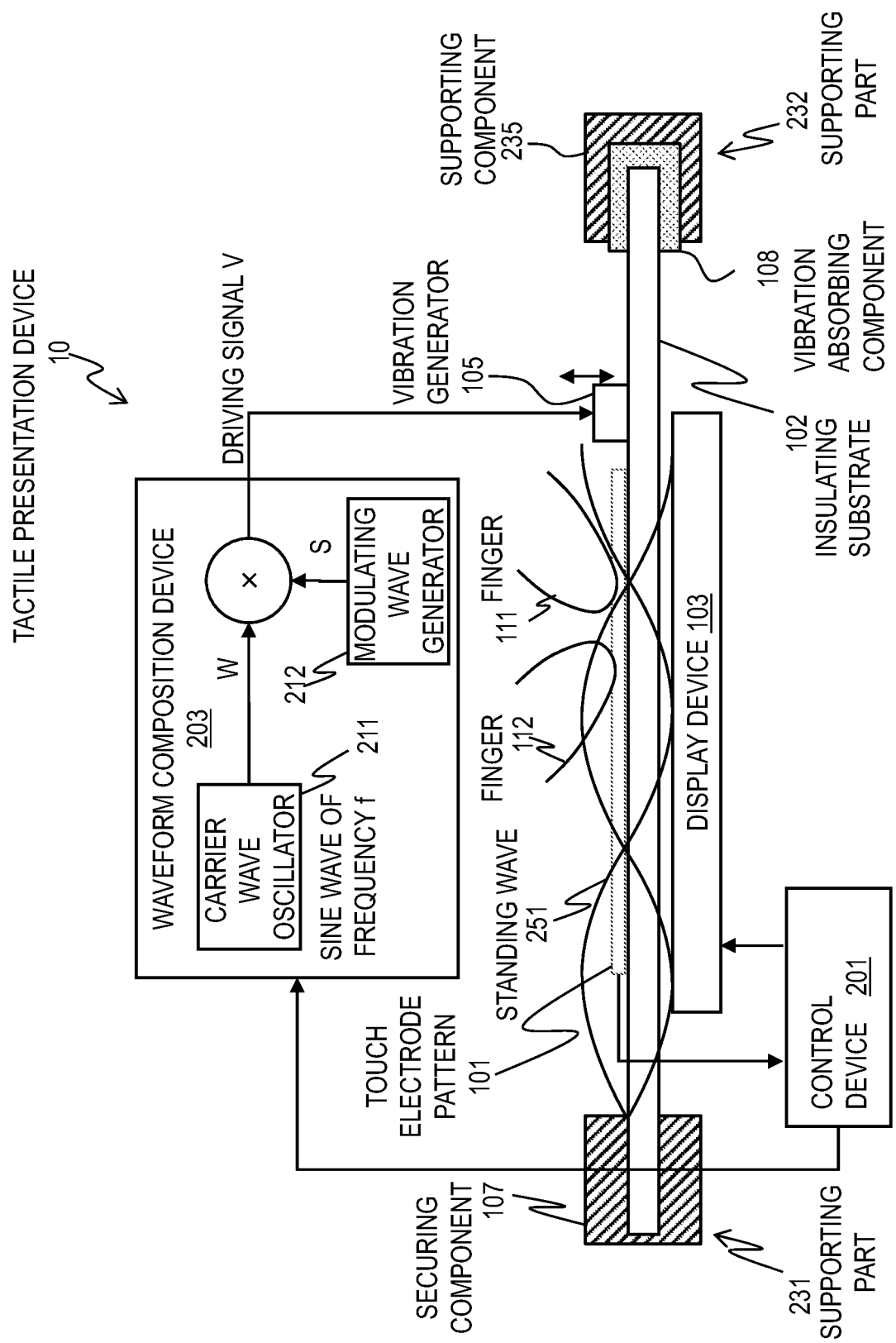
FIG. 3 is a schematic diagram for explaining the driving control of the tactile presentation device.

FIG. 3 is a schematic diagram for explaining the driving control of the tactile presentation device 10. The driving control device of the tactile presentation device 10 includes a control device 201 and a waveform composition device 203, which is a driving device. The control device 201 controls the display device 103 such that a desired image is presented to a user through the transparent insulating substrate 102 of the tactile presentation panel.

The control device 201 may include at least one computer that executes programs, and at least one storage device. The computer may include a processor, a GPU (Graphics Processing Unit), and an FPGA (Field Programmable Gate Array), for example. The storage device stores therein programs and data used by the control device 201. The storage device may include a volatile or non-volatile memory. The storage device includes a work area used by programs.

The control device 201 operates as a function part (module) to control the display device 103 and the tactile presentation panel 100. Specifically, the control device 201 performs touch detection, display control and tactile presentation control. The display control is to control the display of UIs in the display device 103. Specifically, the display control is to retrieve setting information of the UIs from the storage device, and controls the display device 103 according to the setting information so that UIs including at least one object are displayed.

The control device 201 drives the touch electrode pattern 101, and based on a signal received from the touch electrode pattern 101, detects the position(s) on the insulating substrate 102 touched by one or a plurality of fingers. The control device 201 controls images to be displayed by the display device 103 based on the detected touched positions, and controls the vibration generator 105.

For example, if the finger 112 is touching the position corresponding to a specific object image, and the finger 111 is touching the background area, the control device 201 controls the vibration generator 105 to generate a standing wave having a greater amplitude at the finger 112, and a smaller amplitude at the finger 111.

The control device 201 controls the waveform composition device 203 to generate a driving signal V that makes the vibration generator 105 vibrate at a desired frequency. The waveform composition device 203 includes a carrier wave oscillator 211 and a modulating wave generator 212. The carrier wave oscillator 211 outputs, as a carrier wave W, a sine wave having the frequency specified by the control device 201. The modulated wave generator 212 outputs a modulating wave S that modulates the carrier wave W. The modulating wave has a prescribed window function. The composite wave of the carrier wave W and the modulating wave S is the driving wave V that drives the vibration generator 105.

The tactile presentation panel 100 (insulating substrate 102) is supported by supporting parts 231 and 232 at respective ends. The supporting part 231 is constituted of the securing component 107, and the supporting part 232 is constituted of the vibration absorbing component 108 and a supporting component 235. The supporting component 235 may be formed of the same material as the securing component 107, for example. The supporting part 232 supports the end of the insulating substrate 102 by the supporting component 235 through the vibration absorbing component 108.

As described above, the first end of the insulating substrate 102 supported by the supporting part 231 functions as a fixed end of the carrier wave. On the other hand, the second end of the insulating substrate 102 supported by the supporting part 232 functions as an absorption end that absorbs a greater amount of carrier wave than the fixed end. The vibration generator 105 is disposed at the position closer to the supporting part 232 than the supporting part 231.

In the area between the vibration generator 105 and the supporting part 231, a standing wave 251 having a node at the end supported by the supporting part 231 is formed. The standing wave 251 indicates the maximum amplitude of the standing wave. The frequency of the standing wave 251 depends on the frequency of the vibration generator 105. It is possible to form a standing wave having a desired frequency by changing the frequency of the vibration generator 105.

When a plurality of fingers are touching the touch target area 104, by adjusting the frequency of the standing wave, it is possible to present tactile feedback such as click feeling selectively to a specific finger. Specifically, the standing wave is formed such that the position of the finger to which the click feeling is presented comes near an antinode, and the position of the finger to which the click feeling is not presented comes near a node.

The tactile presentation panel 100 may also include a force sensor. The force sensor is used to detect a force applied by the user in the direction perpendicular to the primary surface of the tactile presentation panel 100. The control device 201 makes the vibration generator 105 vibrate only when a specific area on the touch electrode pattern 101 is touched and the value detected by the force sensor exceeds a threshold value, for example. For each functional unit included in the control device 201, a plurality of functional units may be integrated into one functional unit, or one functional unit may be divided into a plurality of functional units for each function.

<Generation of Driving Waveform>

Figure 4:
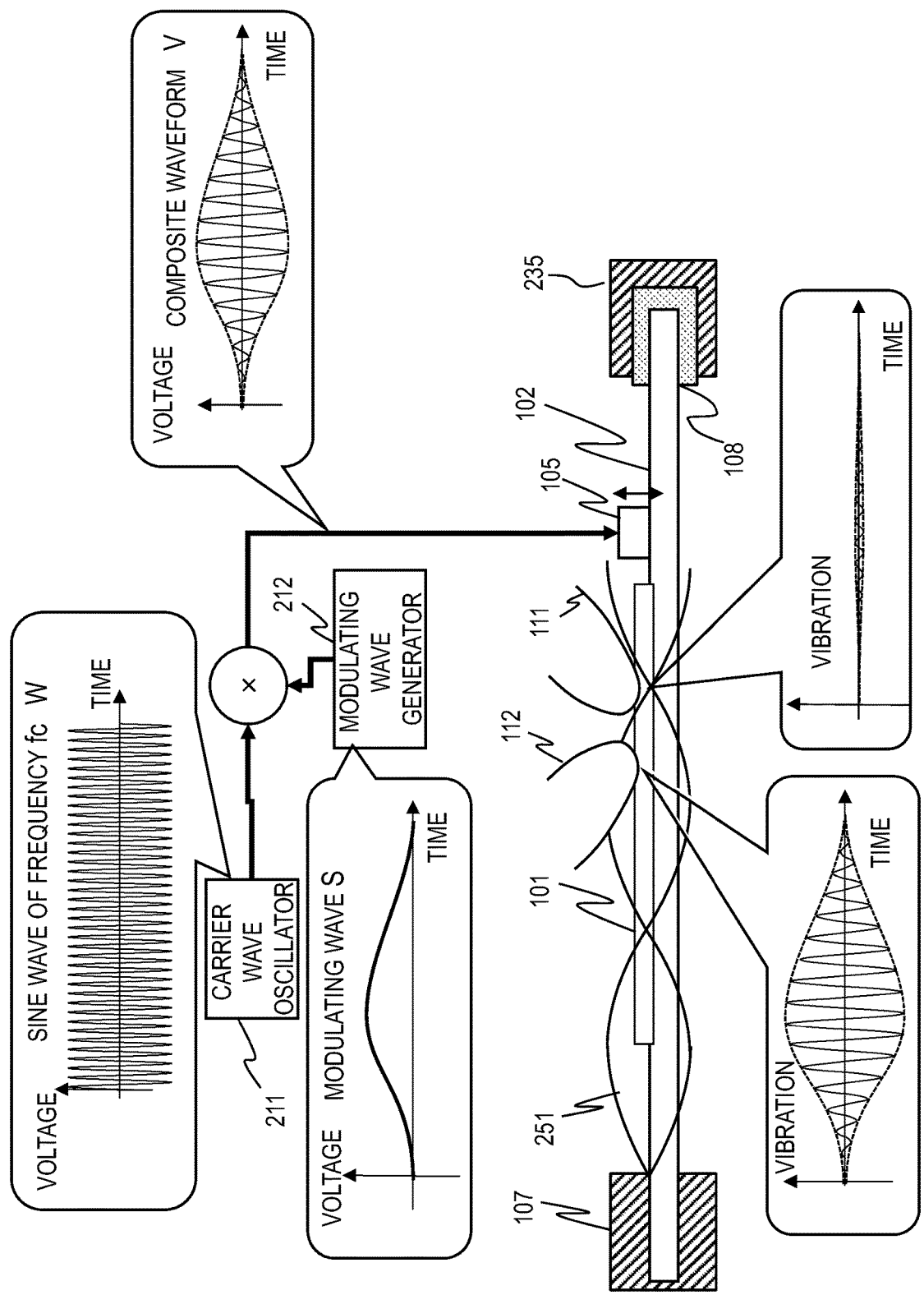
FIG. 4 is a schematic diagram for explaining the generation of driving signal V by the waveform composition device, and the standing wave generated by the vibration generator.

FIG. 4 is a schematic diagram for explaining the generation of driving signal V by the waveform composition device 203 (see FIG. 3), and the standing wave generated by the vibration generator 105. The control device 201 (see FIG. 3) determines the frequency of vibration of the vibration generator 105 such that the position of the finger to which tactile feedback is not presented, of the two fingers detected to be touching the surface, comes near a node of the standing wave. This way, it is possible to present tactile feedback to only one of the two adjacent fingers. The control device 201 detects the touch positions of the two fingers touching the insulating substrate 102 at the same time based on the signal from the touch electrode pattern 101. According to the setting, the control device 201 selects one finger to which tactile feedback is not presented, from the two fingers. For example, the finger touching the background area is selected.

The control device 201 has stored therein information for associating the frequencies of the driving signal given to the vibration generator 105 with node positions of standing waves. For example, the control device 201 selects a standing wave that allows one of the detected fingers to be within a prescribed distance from a node, and the other finger to be outside the prescribed distance from a node. The control device 201 then controls the waveform composition device 203 to generate a driving signal V corresponding to the standing wave. This way, the control device 201 can present tactile feedback to only one finger of the two adjacent fingers. That is, it is possible to cause vibration at one selected position and suppress vibration at a different selected position at the same time.

As illustrated in FIG. 4, the carrier wave oscillator 211 generates a sine wave W having a frequency of fc, based on the command from the control device 201. The range of the frequency fc is from several hundred Hz to several kHz.

The modulating wave generator 212 generates and outputs a prescribed modulating wave S. The modulating wave S has a window function waveform that gradually decrease and gradually increase. The window function waveform is a waveform constituted of a frequency component of 2 Hz to 100 Hz, which characterizes tactile stimulation. This makes it possible to present tactile feedback to a selected finger more appropriately.

The sine wave W having a frequency of fc is modulated by the modulating wave S having a waveform that allows for tactile perception, and as a result, a composite wave V is generated as the driving signal. The driving signal V is given to the vibration generator 105, and the vibration generator 105 vibrates in accordance with the driving signal V.

The vibration propagates from the vibration generator 105 to the insulating substrate 102, forming the standing wave 251. A wave that propagates along the surface of the insulating substrate 102 from the vibration generator 105, which is the source of vibration, is reflected at the fixed end supported by the securing component 107, forming the standing wave 251. The finger 112 is not located near a node of the standing wave 251. In the example of FIG. 4, the finger 112 is located near an antinode of the standing wave 251. Large vibration is generated at the position of the finger 112, and envelope vibration is perceived by the user. On the other hand, the finger 111 is touching a position near a node of the standing wave 251. At a node, vibration is very small because carrier waves cancel each other. Thus, the finger 111 does not feel vibration on the surface of the insulating substrate 102.

<Panel Vibration>

Figure 5:
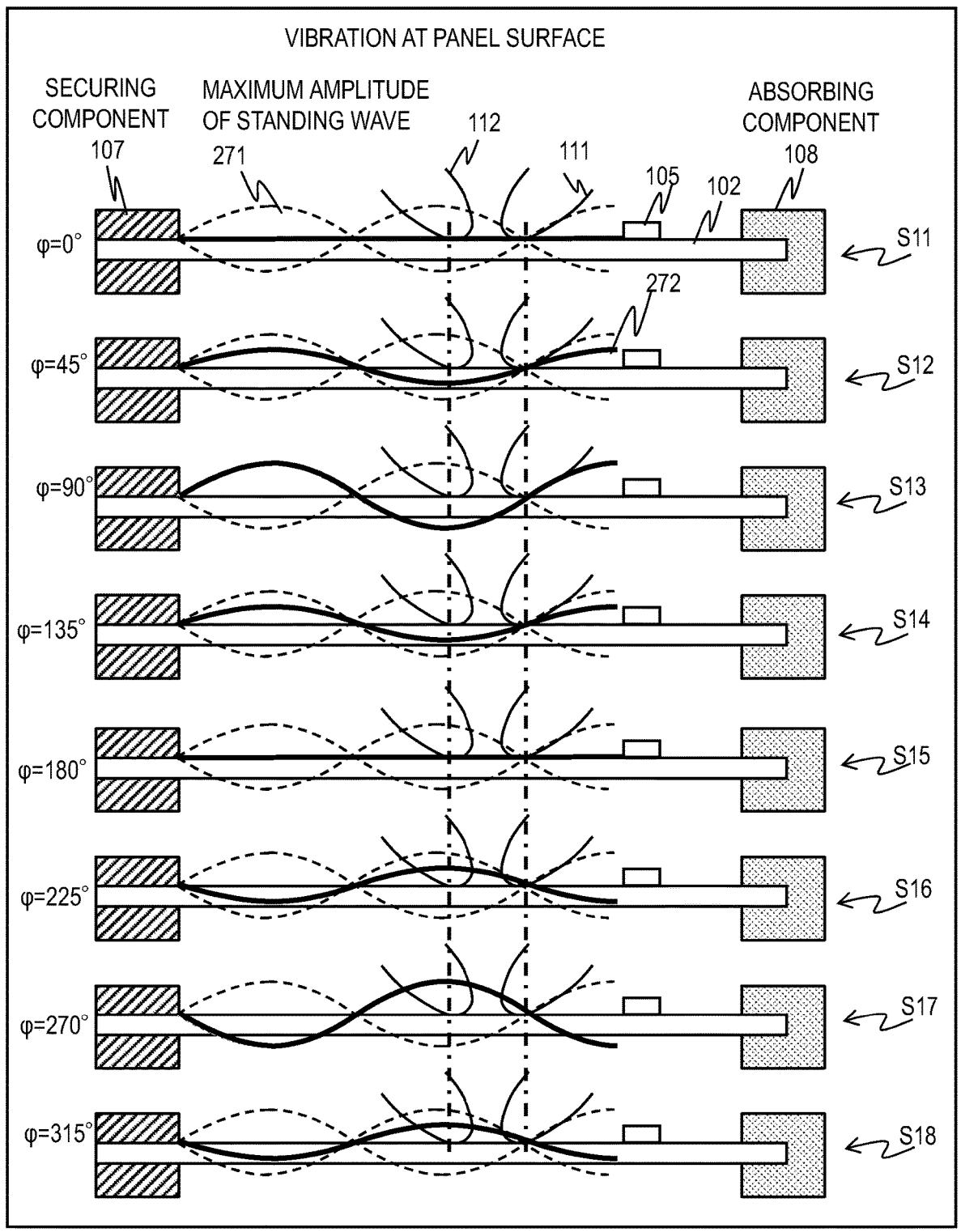
FIG. 5 schematically illustrates vibration of a standing wave on the panel surface (touch surface) of the tactile presentation panel.

FIG. 5 schematically illustrates vibration of a standing wave on the panel surface (touch surface) of the tactile presentation panel 100. FIG. 5 illustrates different vibration states S11 to S18. In FIG. 5, the broken line 271 shows the maximum amplitude of the standing wave. The solid line 272 shows the actual waveform of the standing wave at each vibration state. In FIG. 5, one representative broken line and one representative solid line are denoted with the reference characters 271 and 272, for example.

The vibration states S11 to S18 show the states of the standing wave at different phases. Specifically, the vibration states S11 to S18 illustrate the states of the standing wave at the phase φ=0°, 45°, 90°, 135°, 180°, 225°, 270°, and 315°, respectively. The maximum amplitude of the standing wave varies from 2 μm to 100 μm, for example. The panel surface vibrates largely at the position of the finger 112, but barely vibrates at the position of the finger 111. Thus, the user perceives vibration only by the finger 112.

Figure 6:
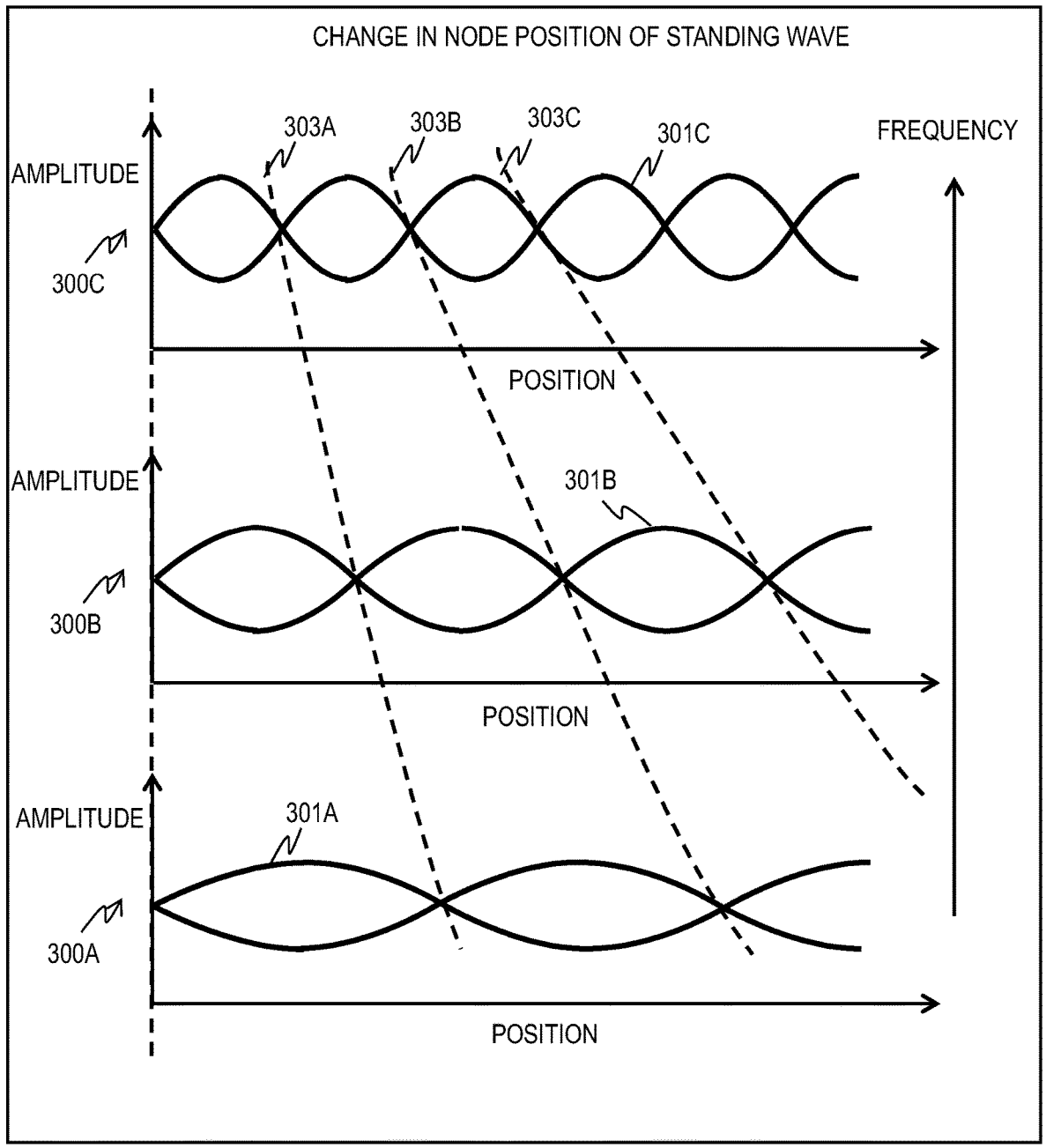
FIG. 6 schematically illustrates the relationship between the frequencies of the standing wave and the node positions of the standing wave.

FIG. 6 schematically illustrates the relationship between the frequencies of the standing wave and the node positions of the standing wave. Graphs 300A, 300B, and 300C illustrate the relationship between the positions on the panel surface and the maximum amplitude of standing waves having different frequencies. Graphs 300A, 300B, and 300C illustrate waveforms 301A, 301B, and 301C of the standing waves of the maximum amplitude. The frequency of the standing wave 301A of Graph 300A is the smallest, and the frequency of the standing wave 301C of Graph 300C is the largest. The positions on the panel are positions on the X axis illustrated in FIGS. 1A and 1B, for example.

Broken lines 303A, 303B, and 303C illustrate how node positions change in response to a change in frequency of the standing waves. The broken line 303A illustrates the position of the node next to the fixed end (first node) in the standing waves having respective frequencies. The broken line 303B illustrates the position of the second node in the standing waves of respective frequencies. The broken line 303C illustrates the position of the third node in the standing waves of respective frequencies.

As illustrated in FIG. 6, the number and position of the nodes change in accordance with the frequency of the standing wave. The position of the nodes is independent of the vibration absorption rate at the end near the vibration generator, rather than depending thereon. The control device 201 has stored therein management information for associating the frequency fc of the driving signal of the vibration generator 105 with the node positions. In generating this management information, it is possible to associate the frequency fc of the driving signal with the node positions through the frequency of the standing wave.

<Effect of Vibration Absorbing Component>

The effects of the vibration absorbing component 108 will be explained below. Whether the end having the vibration generator 105 (vibration generator side) is a fixed end, absorption end, or free end, a standing wave can be formed between that end and the fixed end (securing component 107) at the opposite side of the vibration generator 105. However, the study conducted by the inventors has revealed that the stability of amplitude of the standing wave largely differs depending on the state of the end on the vibration generator side.

Specifically, when the end on the vibration generator side is an absorption end, the amplitude of the standing wave becomes the most stable, and when the end on the vibration generator side is a fixed end, the amplitude of the standing wave becomes the least stable. Being more stable means being less susceptible to a change in amplitude caused by the vibration frequency of the vibration generator (i.e., the frequency of the standing wave). That is, when the end on the vibration generator side is an absorption end, the standing wave is least susceptible to a change in amplitude caused by the vibration frequency, and when the end on the vibration generator side is a fixed end, the standing wave is most susceptible to a change in amplitude caused by the vibration frequency.

The absorption end is an end supported by a vibration absorbing part (vibration absorbing component or vibration absorbing mechanism), and can reduce the absolute value of the reflection rate of the carrier wave. It is ideal that the absorption end allows the reflection rate of the carrier wave to be zero. The reflection rate of the carrier wave of an ideal fixed end is −1, and the reflection rate of the carrier wave of an ideal free end is 1. The negative reflection rate means the phase of the reflected wave is opposite to the phase of the incident wave, or in other words, the direction of displacement is opposite.

Figure 7A:
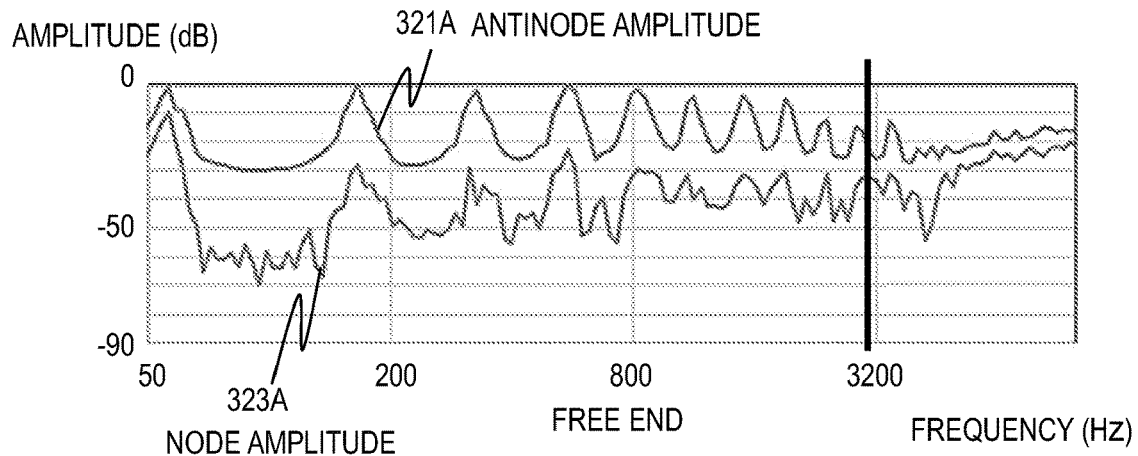
FIG. 7A is a graph showing the experiment results of the antinode amplitude and the node amplitude of the standing wave at a free end.

FIG. 7A is a graph showing the experiment results of the antinode amplitude and the node amplitude of the standing wave at a free end. The horizontal axis is the frequency of the standing wave, and the vertical axis is the amplitude. Line 321A illustrates how the antinode amplitude changes in response to the frequency. Line 323A illustrates how the node amplitude changes in response to the frequency. The antinode and node amplitudes are plotted, given that the largest antinode amplitude in the entire frequency range is 1.

Figure 7B:
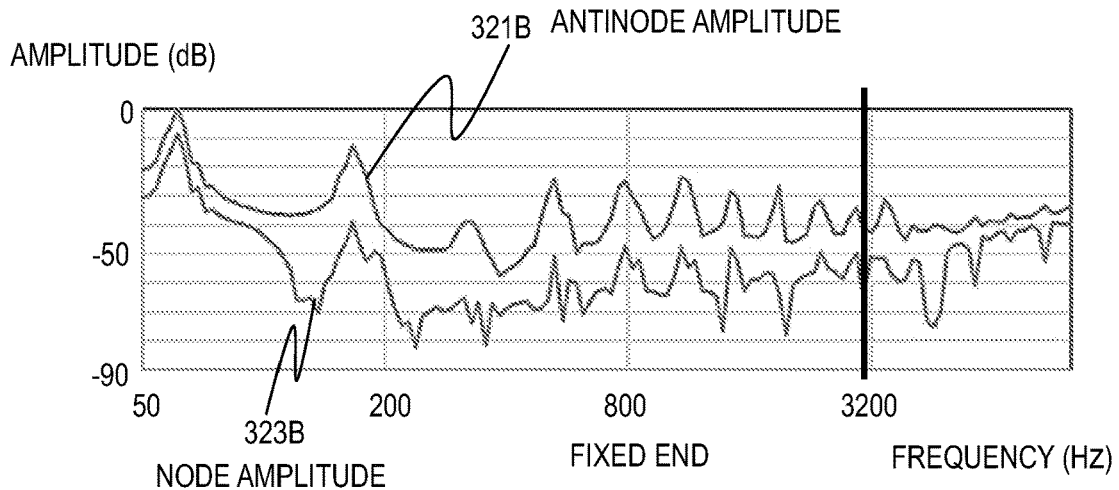
FIG. 7B is a graph showing the experiment results of the antinode amplitude and the node amplitude of the standing wave at a fixed end.

FIG. 7B is a graph showing the experiment results of the antinode amplitude and the node amplitude of the standing wave at a fixed end. The horizontal axis is the frequency of the standing wave, and the vertical axis is the amplitude. Line 321B illustrates how the antinode amplitude changes in response to the frequency. Line 323B illustrates how the node amplitude changes in response to the frequency. The antinode and node amplitudes are plotted, given that the largest antinode amplitude in the entire frequency range is 1.

Figure 7C:
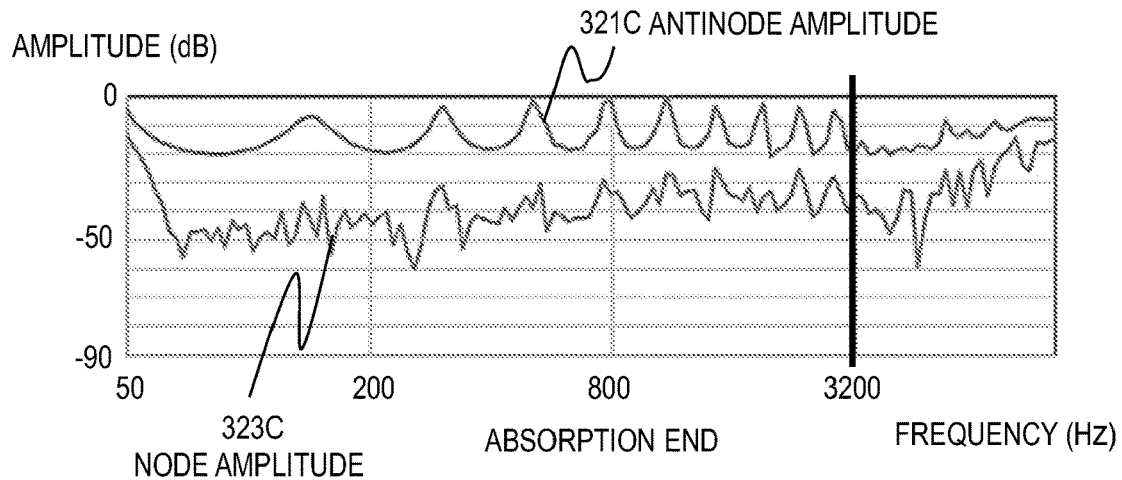
FIG. 7C is a graph showing the experiment results of the antinode amplitude and the node amplitude of the standing wave at an absorption end.

FIG. 7C is a graph showing the experiment results of the antinode amplitude and the node amplitude of the standing wave at an absorption end. The horizontal axis is the frequency of the standing wave, and the vertical axis is the amplitude. Line 321C illustrates how the antinode amplitude changes in response to the frequency. Line 323C illustrates how the node amplitude changes in response to the frequency. The antinode and node amplitudes are plotted, given that the largest antinode amplitude in the entire frequency range is 1.

As illustrated in FIGS. 7A to 7C, in any of the conditions, a substantial difference exists between the antinode amplitude and the node amplitude. With either the free end, the fixed end, or the absorption end, a difference between the antinode amplitude and the node amplitude is at least 20 dB in the frequency range, which makes it possible to present tactile feedback only at a specific position with the standing wave. When the free end graph of FIG. 7A is compared with the fixed end graph of FIG. 7B, a change in antinode amplitude and node amplitude due to the frequency is smaller in the free end configuration than that of the fixed end configuration. Thus, in the configuration where the end on the vibration generator side is a free end, a more stable standing wave can be formed as compared with the configuration where the end on the vibration generator side is a fixed end.

Below, the absorption end graph of FIG. 7C is compared with the free end graph of FIG. 7A and the fixed end graph of FIG. 7B. A change in antinode amplitude and node amplitude due to the frequency is smaller in the absorption end configuration than that of the fixed end configuration. Furthermore, in the absorption end configuration, a change in antinode amplitude and node amplitude due to the frequency is smaller than that of the free end configuration.

The control device 201 changes the position to present tactile feedback and the position not to present tactile feedback by changing the vibration frequency of the vibration generator 105 in accordance with the positions of fingers in contact with the panel surface and display images. Therefore, for more appropriate tactile presentation control, it is important to ensure that the difference between the antinode amplitude and the node amplitude is kept small at various vibration frequencies.

As described above, the standing wave is affected by the reflected wave at the end on the vibration generator side. By using a free end or absorption end for the end on the vibration generator side, resonance between the reflected wave and the carrier wave from the vibration generator 105 can be suppressed. As a result, fluctuation of the antinode amplitude and the node amplitude caused by the vibration frequency is reduced, which makes it possible to form a stable standing wave based on the fixed end on the tactile presentation panel, regardless of the frequency. Placing a vibration generator at both ends is another possible way for changing the node positions, but in this case, the movement conditions for the node positions would be complicated, and it would be very difficult to control the positions.

<Selection of Standing Wave Frequency>

Next, the frequency of standing wave will be explained. The vibration frequency of the vibration generator 105 corresponds to the frequency fc of the driving signal V. The vibration frequency increases or decreases in response to an increase or decrease in fc. The frequency of standing wave also increases or decreases in response to an increase or decrease in frequency of the vibration generator 105. As described above, the tactile presentation device 10 can present tactile feedback to only one finger of the two adjacent fingers by using a standing wave.

Because a finger is typically as big as 1 to 2 cm, if the wavelength of the standing wave is smaller than a quadruple of the minimum distance between the two fingers, then it would be difficult to present tactile feedback only at a certain spot. Also, the frequency of the carrier wave W that generates the standing wave needs to be sufficiently higher than the window function of the modulating wave S that characterizes the tactile feedback (several Hz to 100 Hz). Thus, the frequency of the carrier wave is selected from a range greater than several hundred Hz, for example. As presumed from the graphs of FIGS. 7A to 7C, when the frequency exceeds 3 kHz, the standing wave becomes unclear. Based on the finger size described above, it is preferable that the wavelength of the standing wave be 8 cm or longer. The insulating substrate 102 that functions as the touch surface is typically made of glass, and based on the relationship between the wavelength and the frequency, the frequency of standing wave is set to 300 Hz or greater and 2 kHz or smaller, for example.

When the frequency of standing wave changes, tactile feedback is perceived differently. Thus, the control device 201 may also have a predetermined reference frequency. Multiple standing waves with different frequencies may have a node at the same position. In selecting a standing wave having a node at a desired position, the control device 201 selects a standing wave having as close frequency as possible to the reference frequency. This way, tactile feedback given to the finger becomes more even in tactile presentation.

<Selection of Carrier Wave Frequency>

Figure 8:
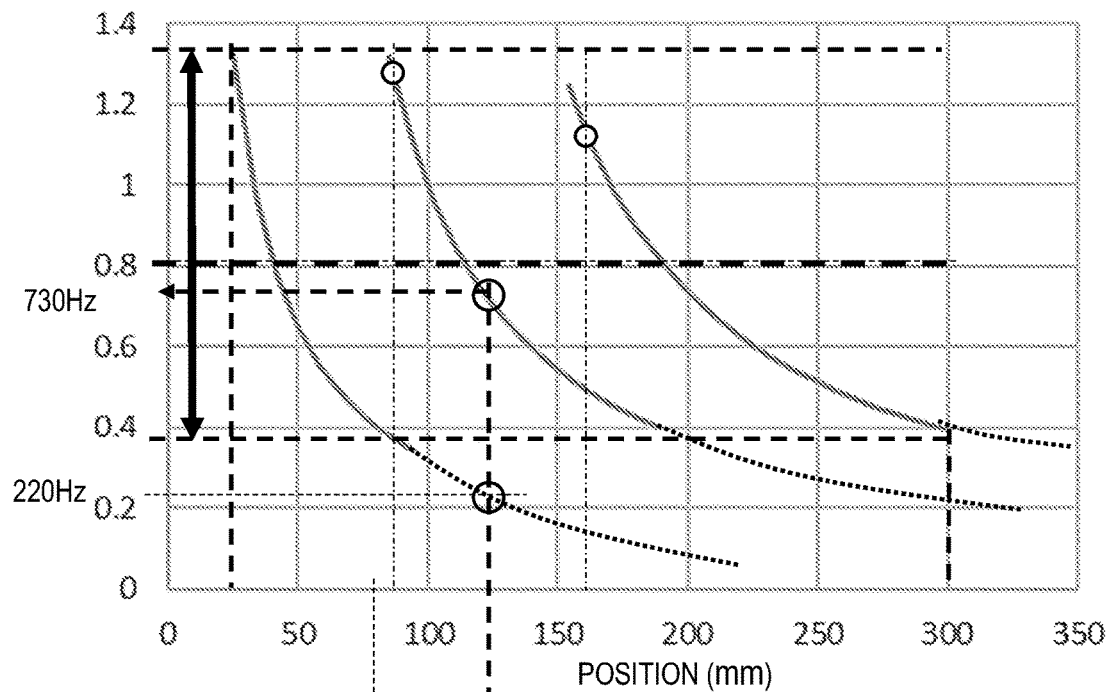
FIG. 8 is a diagram for explaining how the control device performs this process.
Figure 8:
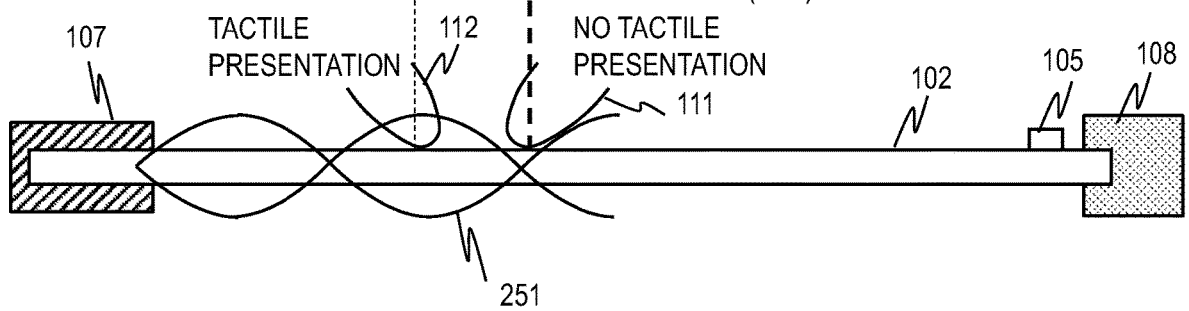

Next, how the control device 201 selects the frequency fc of the carrier wave oscillator 211 for the position of the finger to which tactile feedback is not presented will be explained. FIG. 8 is a diagram for explaining how the control device 201 performs this process. The frequency of the standing wave, the frequency of the vibration generator 105, and the frequency fc of the carrier wave are the same as each other.

In FIG. 8, the graph illustrates the relationship between the position of each node of the standing wave and the position on the tactile presentation panel 100. The horizontal axis indicates the distance from the fixed end supported by the securing component 107. This corresponds to the position on the X axis of FIG. 1A or FIG. 1B. The vertical axis indicates the frequency fc of the carrier wave oscillator 211. The three lines on the graph illustrate the relationship between the frequency and the position of each node of the standing wave respectively having a differing distance from the fixed end.

Here, the reference frequency of the carrier wave oscillator 211 used by the control device 201 is 800 Hz. In selecting a standing wave having a node at a desired position, the control device 201 selects a frequency fc that is as close as possible to the reference frequency of 800 Hz. The vibration generator 105 vibrates at the reference vibration rate corresponding to the reference frequency.

Assuming that the finger 112 is detected to be at the 80 mm position, the finger 111 is detected to be at the 125 mm position, and the control device 201 determines that tactile feedback is to be presented to the finger 112, but not to the finger 111, the graph of FIG. 8 shows that the standing wave having a frequency of 220 Hz and the standing wave having a frequency of 730 Hz each have a node at the position of the finger 111.

The control device 201 selects the carrier wave frequency of 730 Hz that is closer to the reference frequency of 800 Hz. With the standing wave having a node at the position of the finger 111, it is possible to present tactile feedback to the finger 112 only. In the example illustrated in FIG. 8, by selecting a carrier wave frequency ranging from 380 Hz to 1350 Hz, it is possible to form a node of a standing wave in any position ranging from 25 mm to 300 mm.

<Position of Vibration Generator>

Next, the placement of the vibration generator 105 will be explained. As described above, by attenuating the refection at the end on the vibration generator side by the vibration absorbing component, it is possible to form a more stable standing wave with a smaller fluctuation in amplitude in the applicable frequency range. In an actual device, it is difficult to completely cancel the reflected wave by the vibration absorbing component.

Thus, the end on the vibration generator side supported by the vibration absorbing component has a property between the free end and the fixed end. If the property of the absorption end is more similar to that of the free end, the reflection rate becomes positive. On the other hand, if the property of the absorption end is more similar to that of the fixed end, the reflection rate becomes negative.

The absolute value of the reflection rate at the end on the vibration generator side is smaller than that of the opposing end supported by the securing component 107. An ideal absorption end has the reflection rate that is as close as possible to zero. As described above, the reflection rate of the opposing end supported by the securing component 107 is negative. An ideal fixed end has the reflection rate that is as close as possible to −1. On the other hand, if the end is not supported by anything and free, then the reflection rate at that end becomes positive. An ideal free end has the reflection rate that is as close as possible to 1.

In one embodiment of the present specification, the position of the vibration generator 105 is determined by the property of the end on the vibration generator side. This way, it is possible to reduce the influence of the reflected wave at the end on the vibration generator side on the standing wave at the touch target area 104.

Figure 9:
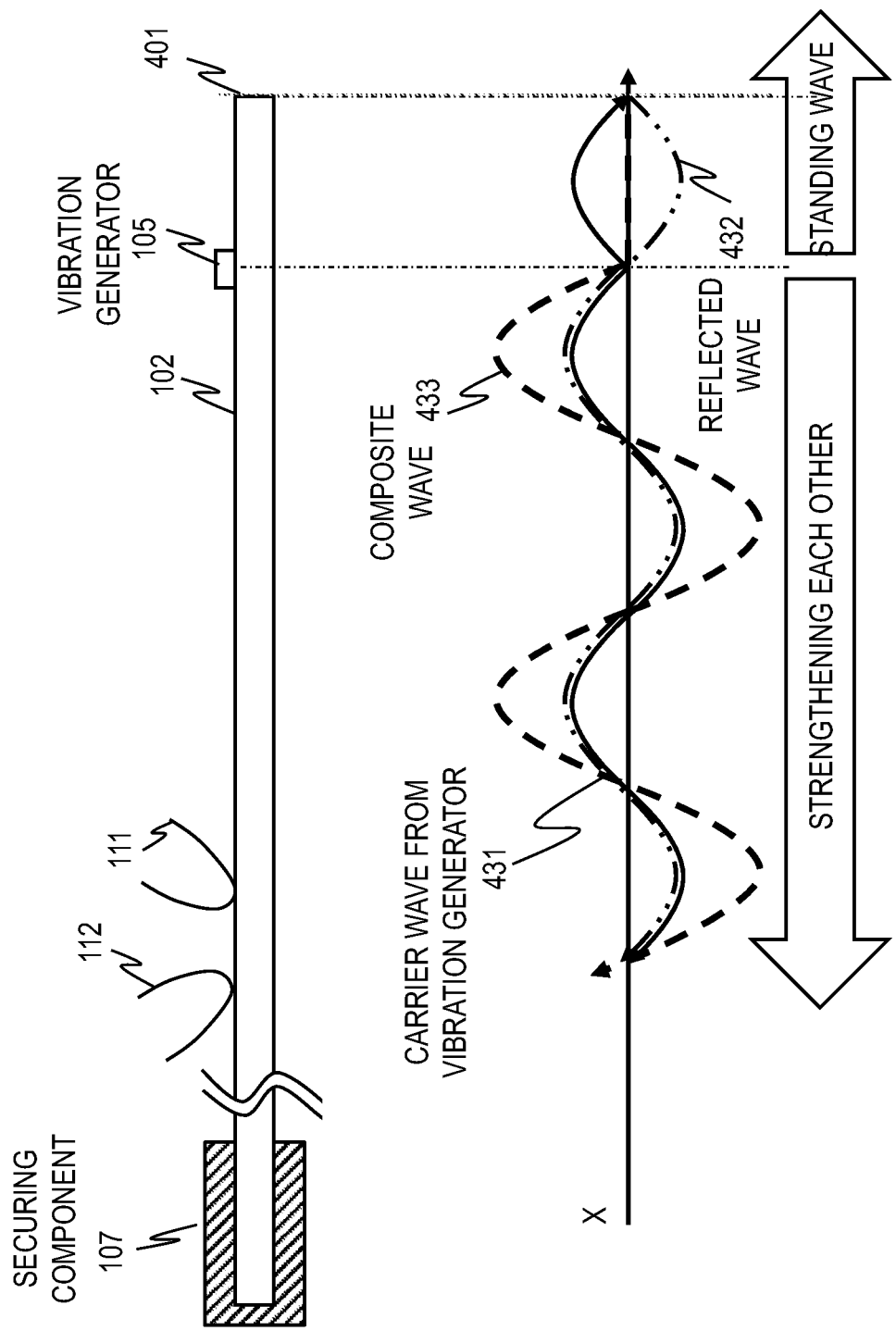
FIG. 9 illustrates the position of the vibration generator in a configuration where the end on the vibration generator side has the property of a free end, and the reflection rate thereof is positive.

FIG. 9 illustrates the position of the vibration generator 105 in a configuration where the end on the vibration generator side has the property of a free end, and the reflection rate thereof is positive. FIG. 9 illustrate the carrier wave with an ideal free end for ease of explanation. In FIG. 9, the solid line 431 indicates the carrier wave from the vibration generator 105. The two-dot dash line 432 indicates the reflected wave at the end 401 on the vibration generator side (reflection end). The broken line 433 indicates the composite wave of the carrier wave 431 and the reflected wave 432.

In one embodiment of the present specification, the distance from the center position (center position on the X axis) of the vibration generator 105 to the end 401 on the vibration generator side is (n/2) times as long as the wavelength of the standing wave generated by the vibration generator. Here, n is an integer of 0 or greater. Under this condition, it is possible to strengthen the carrier wave in the direction from the vibration generator 105 to the securing component 107.

Figure 10:
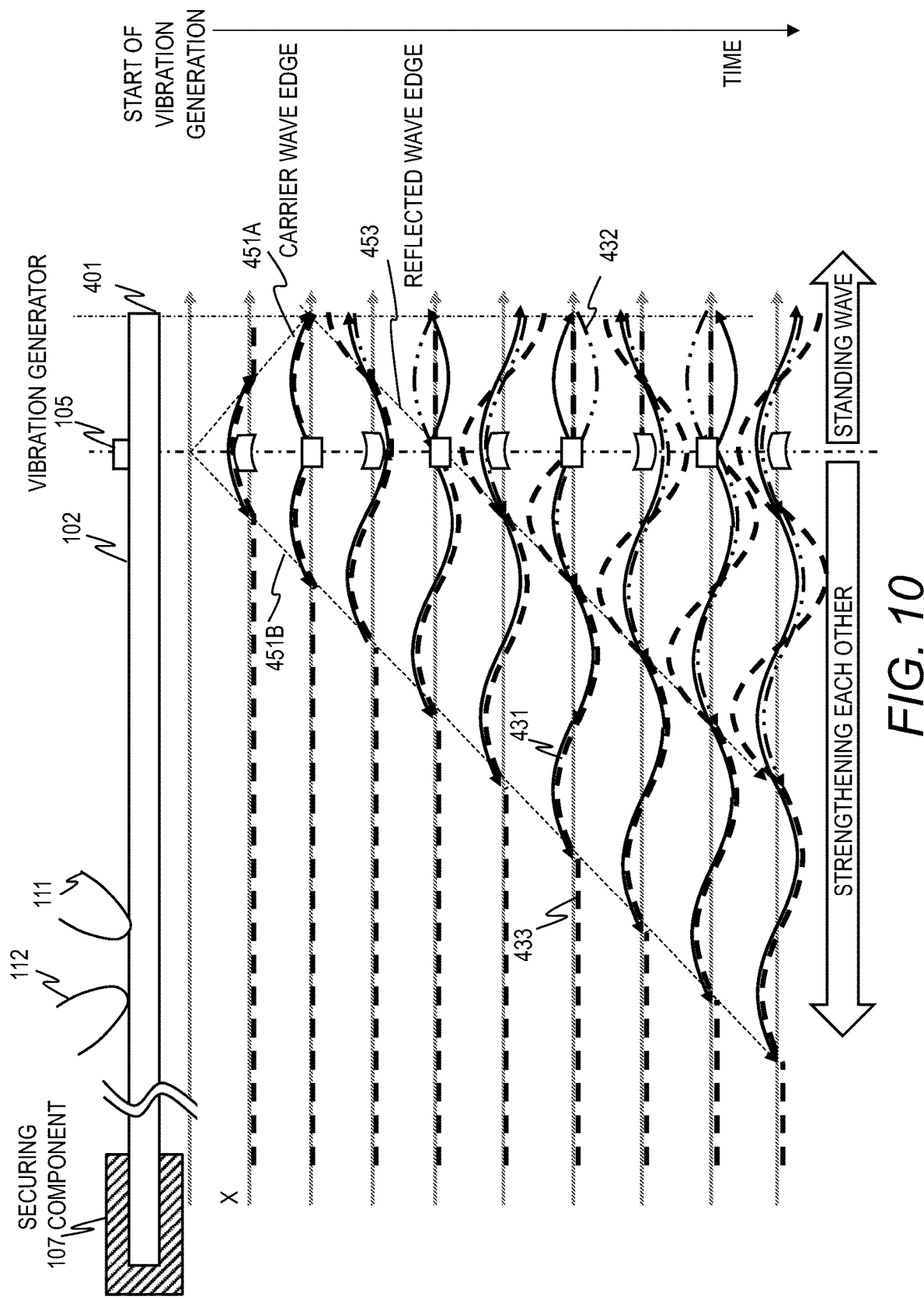
FIG. 10 shows how the carrier wave, the reflected wave and the composite wave respectively change after the vibration generator starts vibrating in the state of FIG. 9.

FIG. 10 shows how the carrier wave 431, the reflected wave 432 and the composite wave 433 respectively change after the vibration generator 105 starts vibrating in the state of FIG. 9. The change in waveforms over time is illustrated from top to bottom of FIG. 10. Similar to FIG. 9, the solid line 431 indicates the carrier wave from the vibration generator 105. The two-dot dash line 432 indicates the reflected wave at the end 401 on the vibration generator side. The broken line 433 indicates the composite wave of the carrier wave 431 and the reflected wave 432. In FIG. 10, the broken lines 451A and 451B indicate the edge of the carrier wave 431 from the vibration generator 105. The broken line 453 indicates the edge of the reflected wave 432.

As illustrated in FIG. 10, the carrier wave and the reflected wave are combined between the vibration generator 105 and the free end 401, generating a standing wave having an antinode at the vibration generator 105 and the free end 401. Between the vibration generator 105 and the securing component 107, the carrier wave and the reflected wave strengthen each other, generating a carrier wave toward the securing component 107 that has a larger amplitude.

On the contrary, if the distance from the center position (center position on the X axis) of the vibration generator 105 to the end 401 on the vibration generator side is (n/2+1/4) times as long as the wavelength of the standing wave generated by the vibration generator 105, the carrier wave toward the securing component 107 weakens. Therefore, by placing the vibration generator 105 at any other positions than that position, the attenuation of the carrier wave can be suppressed.

In order to prevent attenuation of the carrier wave traveling toward the securing component 107, the distance from the center position (center position on the X axis) of the vibration generator 105 to the end 401 on the vibration generator side has to be (n/2−1/6 to n/2+1/6) times as long as the wavelength of the standing wave generated by the vibration generator. The vibration of the vibration generator fluctuates within a prescribed range centering on the reference frequency. In one embodiment of the present specification, this condition is fulfilled regardless the frequency used.

Figure 11:
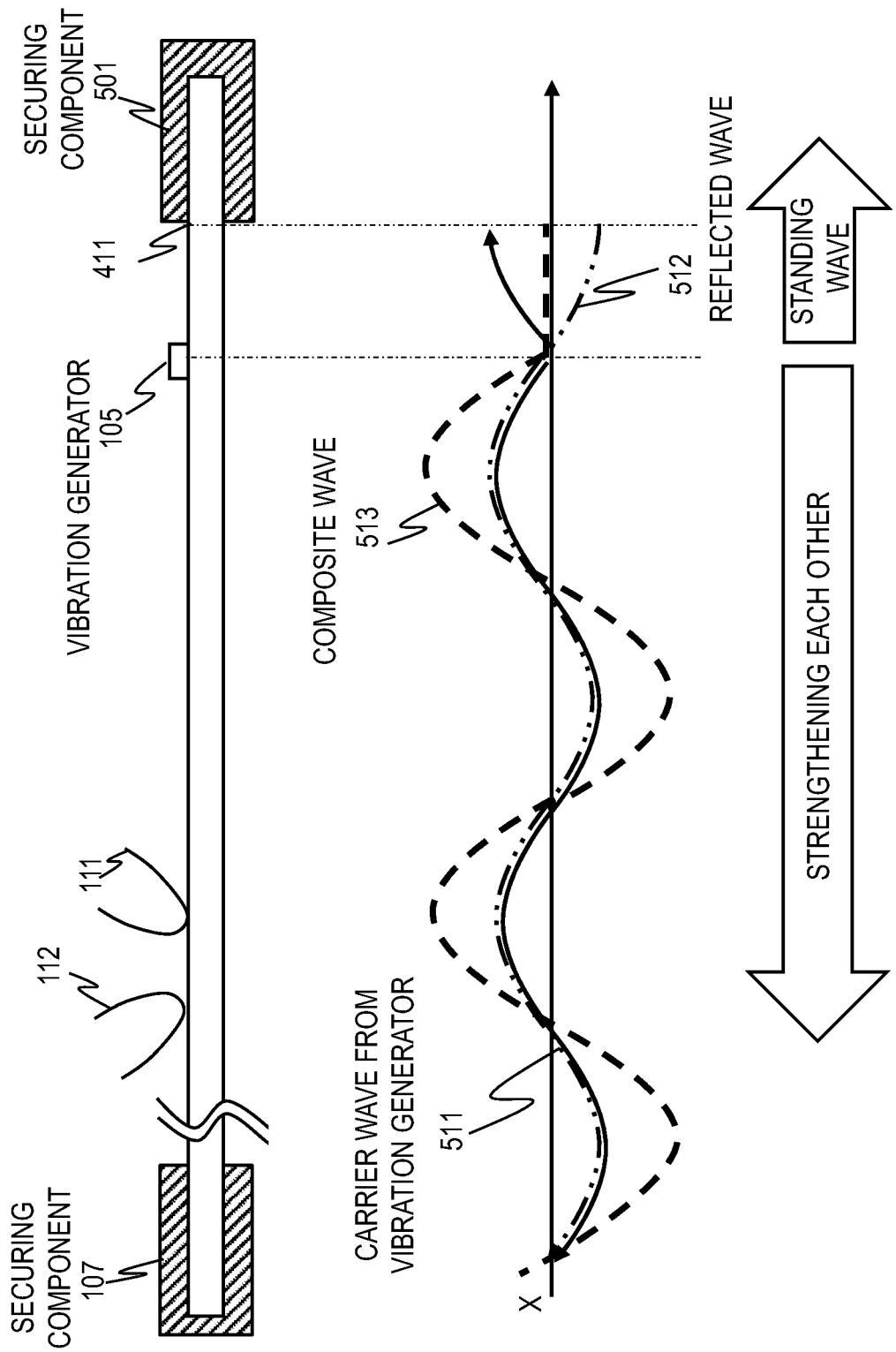
FIG. 11 illustrates the position of the vibration generator in a configuration where the end on the vibration generator side has the property of a fixed end, and the reelection rate thereof is negative.

FIG. 11 illustrates the position of the vibration generator 105 in a configuration where the end on the vibration generator side has the property of a fixed end, and the reelection rate thereof is negative. FIG. 11 illustrates the carrier wave with an ideal fixed end for ease of explanation. The end 411 of the insulating substrate 102 at the vibration generator side (reflection end) functions as a fixed end by a securing component 501.

In FIG. 11, the solid line 511 indicates the carrier wave from the vibration generator 105. The two-dot dash line 512 indicates the reflected wave at the end 411 on the vibration generator side. The broken line 513 indicates the composite wave of the carrier wave 511 and the reflected wave 512.

In one embodiment of the present specification, the distance from the center position (center position on the X axis) of the vibration generator 105 to the end 411 on the vibration generator side is (n/2+1/4) times as long as the wavelength of the standing wave generated by the vibration generator. Here, n is an integer of 0 or greater. Under this condition, it is possible to strengthen the carrier wave traveling from the vibration generator 105 to the securing component 107.

Figure 12:
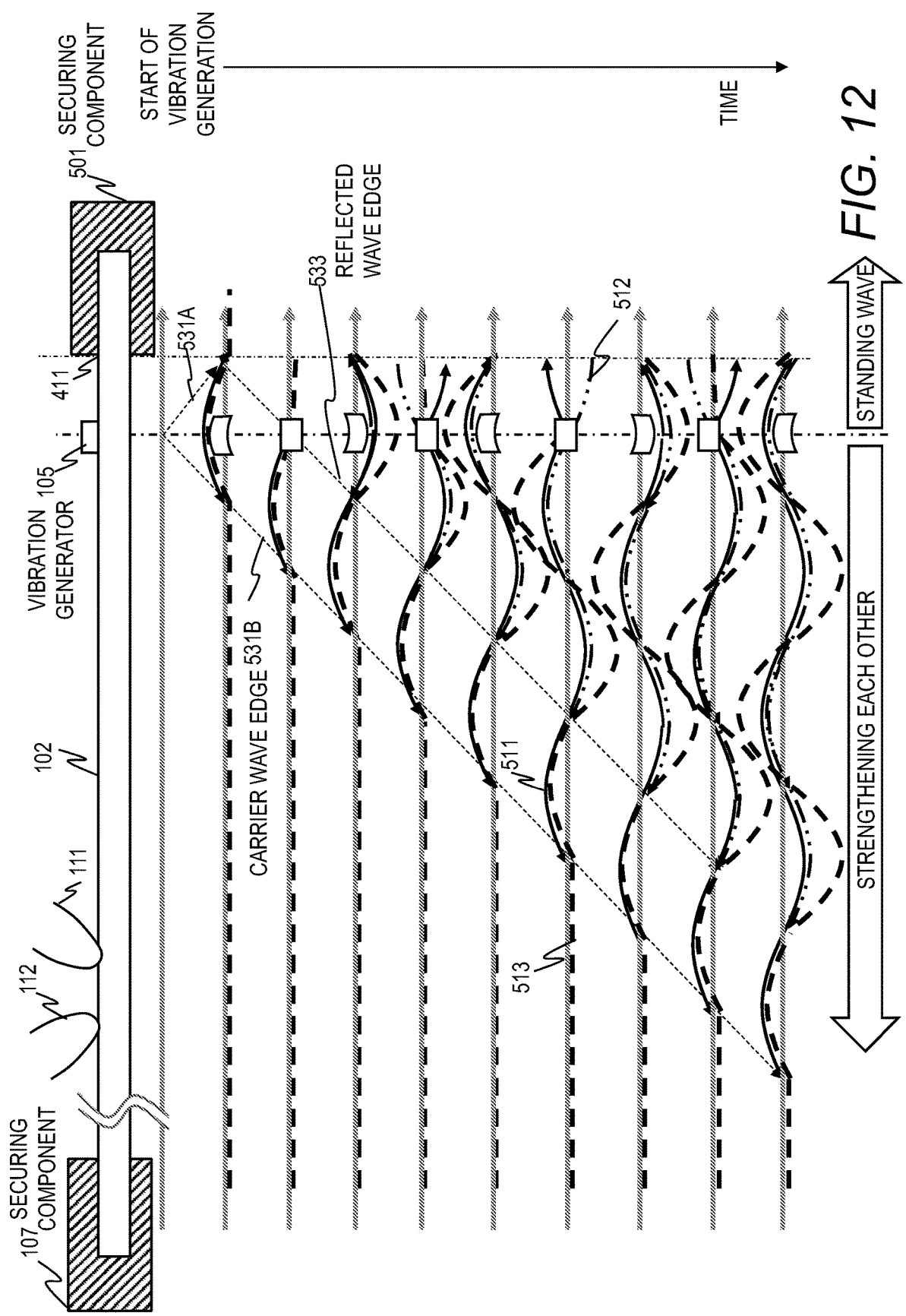
FIG. 12 shows how the carrier wave, the reflected wave and the composite wave respectively change after the vibration generator starts vibrating in the state of FIG. 11.

FIG. 12 shows how the carrier wave 511, the reflected wave 512 and the composite wave 513 respectively change after the vibration generator 105 starts vibrating in the state of FIG. 11. The change in waveforms over time is illustrated from top to bottom of FIG. 12. Similar to FIG. 11, the solid line 511 indicates the carrier wave from the vibration generator 105. The two-dot dash line 512 indicates the reflected wave at the end 411 on the vibration generator side. The broken line 513 indicates the composite wave of the carrier wave 511 and the reflected wave 512. In FIG. 12, the broken lines 531A and 531B indicate the edge of the carrier wave 511 from the vibration generator 105. The broken line 533 indicates the edge of the reflected wave 512.

As illustrated in FIG. 12, the carrier wave and the reflected wave are combined between the vibration generator 105 and the fixed end 411, generating a standing wave having an antinode at the vibration generator 105 and the fixed end 411. Between the vibration generator 105 and the securing component 107, the carrier wave and the reflected wave strengthen each other, generating a carrier wave traveling toward the securing component 107 that has a larger amplitude.

On the contrary, if the distance from the center position (center position on the X axis) of the vibration generator 105 to the end 411 on the vibration generator side is (n/2) times as long as the wavelength of the standing wave generated by the vibration generator, the carrier wave toward the securing component 107 weakens. Therefore, by placing the vibration generator 105 at any other positions than that position, the attenuation of the carrier wave can be suppressed.

In order to prevent attenuation of the carrier wave traveling toward the securing component 107, the distance from the center position (center position on the X axis) of the vibration generator 105 to the end 411 on the vibration generator side has to be (n/2+1/12 to n/2+5/12) times as long as the wavelength of the standing wave generated by the vibration generator. The vibration of the vibration generator fluctuates within a prescribed range centering on the reference frequency. In one embodiment of the present specification, this condition is fulfilled regardless of the frequencies used.

As described above, the end supported by the vibration absorbing component has a property between a free end and a fixed end, and the reflection rate thereof can be either a negative value, which indicates the property of a fixed end, or a positive value, which indicates the property of a free end. By designing the position of the vibration generator appropriately for the reflection rate, it is possible to prevent the attenuation of the carrier wave traveling towards the securing component 107 due to the reflected wave from the opposing end.

Specifically, when the property of the reflection end is more similar to that of a free end (when the reflection rate is greater than 0% but not exceeding 100%), by setting the distance from the reflection end to the vibration center of the vibration generator 105 to be (n/2−1/6 to n/2+1/6) times as long as the wavelength of the standing wave generated by the vibration generator, it is possible to prevent attenuation of the carrier wave traveling toward the touch target area. When the property of the reflection end is more similar to that of a fixed end (when the reflection rate is greater than −100% but not exceeding 0%), the distance is to be (n/2+1/12 to n/2+5/6) times as long as the wavelength of the standing wave having the reference frequency.

This way, it is possible to prevent the attenuation of the carrier wave from the vibration generator 105 (vibration source) toward the touch target area. When the reflection rate is 0%, the wave will not attenuate in the touch target area regardless of the placement of the vibration generator 105.

<Multiplexing of Vibration Generator>

Below, a configuration in which a standing wave is generated by carrier waves from a plurality of vibration generators arranged in series will be explained. The plurality of vibration generators are arranged along the direction of the carrier wave, or in other words, the direction along which nodes and antinodes of the standing wave are aligned. The plurality of vibration generators arranged in series can increase the amplitude of the standing wave.

Figure 13:
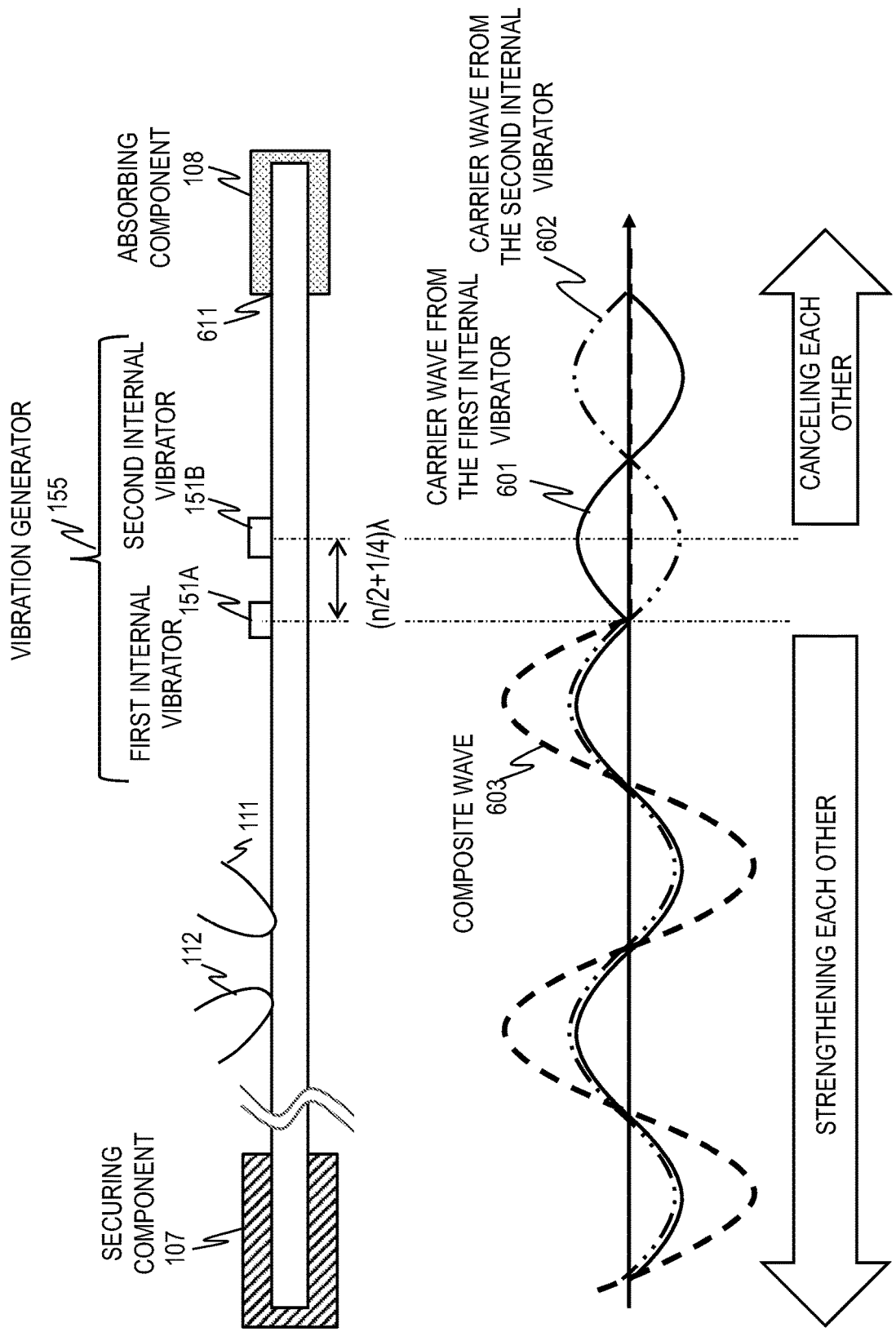
FIG. 13 schematically illustrates a configuration example of the tactile presentation device including a vibration generator constituted of a plurality of internal vibrators arranged in series.

FIG. 13 schematically illustrates a configuration example of the tactile presentation device including a vibration generator constituted of a plurality of internal vibrators arranged in series. The vibration generator 155 is constituted of the first internal vibrator 151A and the second internal vibrator 151B arranged in series. The first internal vibrator 151A and the second internal vibrator 151B may each be made of a single vibration generating element as in the vibration generator 105 illustrated in FIGS. 1A and 1B, for example, or may be constituted of a plurality of vibration generating elements arranged in parallel as in FIG. 2. The difference in phase of the vibrations generated by the first internal vibrator 151A and the second internal vibrator 151B is adjusted such that the carrier waves from the respective internal vibrators 151A and 151B toward the securing component 107 have the same phase as each other.

In FIG. 13, the solid line 601 indicates the carrier wave from the first internal vibrator 151A. The two-dot dash line 602 indicates the carrier wave from the second internal vibrator 151B. The broken line 603 indicates the composite wave of the carrier wave 601 and the carrier wave 602.

In one embodiment of the present specification, the distance from the center position (center position on the X axis) of the first internal vibrator 151A to the center of the second internal vibrator 151B is $(n/2+1/4)$ times as long as the wavelength of the standing wave at the reference frequency. If the standing wave having the reference frequency is generated under this condition, then it is possible to strengthen the carrier wave traveling from the internal vibrators 151A and 151B toward the securing component 107 only. The carrier waves traveling from the internal vibrator 151A and the internal vibrator 151B toward a reflection end 611 weaken each other.

In this embodiment, the vibration of the vibration generator fluctuates within a prescribed range centering on the reference frequency. If the distance from the internal vibrators 151A and 151B to the securing component 107 is within the range of $(n/2+1/6$ to $n/2+1/3)$ of the generated standing wave, the carrier wave traveling toward the reflection end 611 on the vibration generator side is weakened, which makes it possible to suppress unnecessary vibration.

FIG. 13 illustrates the duplex vibration generator where two vibrators are arranged in series as an example of the multiplex vibration generator. In other configuration example, three or more vibration generators may be arranged in series. When the condition described above is fulfilled in each pair of adjacent vibration generators, it is possible to strengthen the carrier wave traveling from the multiplex vibration generator to the securing component 107 only.

<Standing Wave in Multiple Directions>

In the configuration example described above, the standing wave is generated in the touch target area 104 by one or a plurality of vibration generators disposed at one side of the touch target area 104. In one embodiment of the present specification, a vibration generator is place at each of the plurality of sides of the touch target area 104. This way, it is possible to present tactile feedback to a selected finger regardless of the relationship between the touch positions of multiple fingers.

Figure 14A:
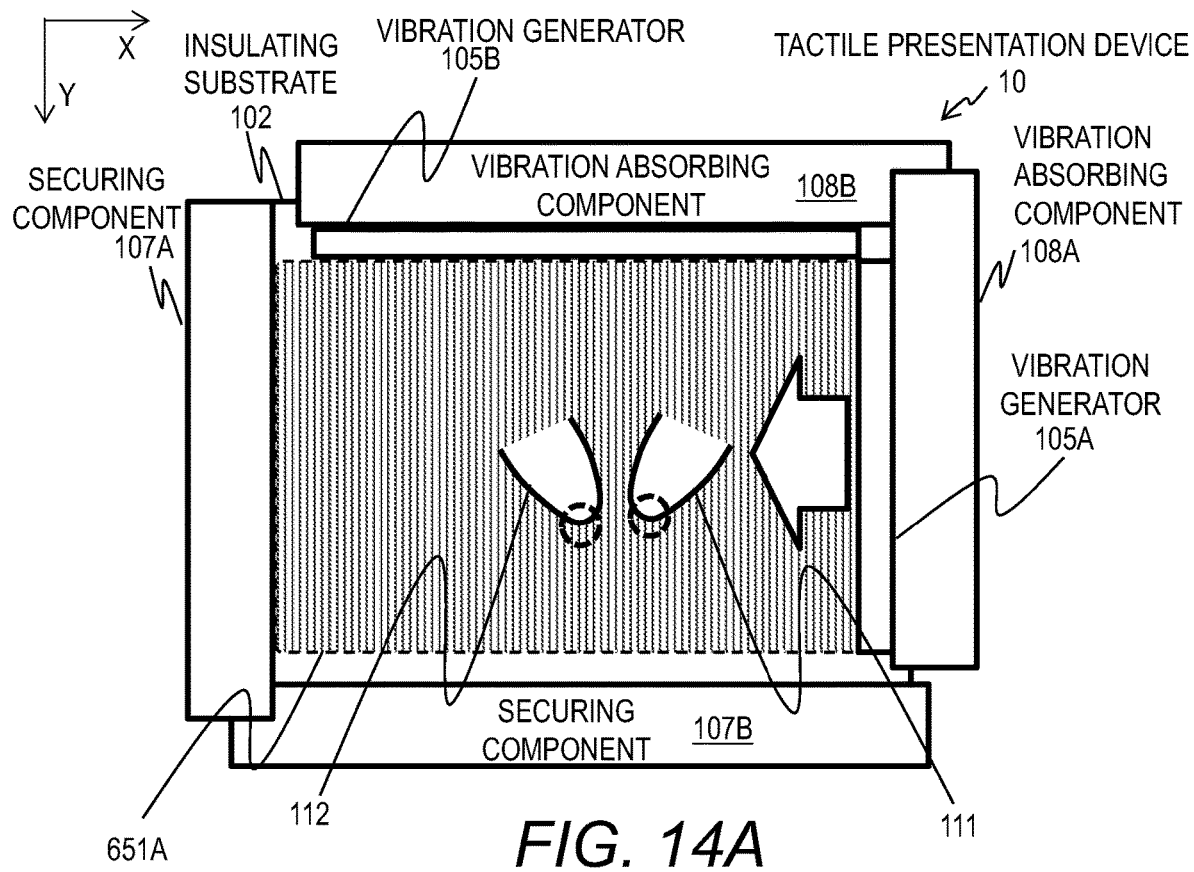
FIGS. 14A and 14B illustrate a configuration example of the tactile presentation device according to one embodiment of the present specification.
Figure 14B:
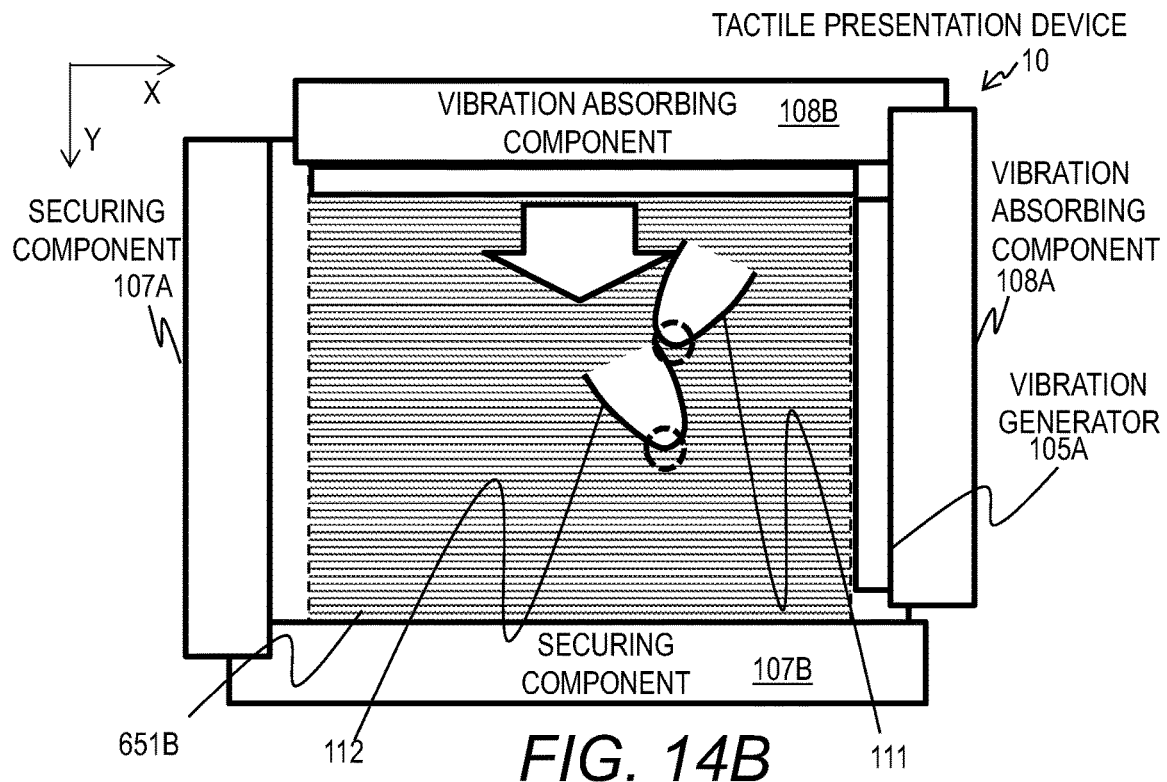

FIGS. 14A and 14B illustrate a configuration example of the tactile presentation device 10 according to one embodiment of the present specification. The tactile presentation device 10 includes two vibration generators 105A and 105B, two securing components 107A and 107B, and two vibration absorbing components 108A and 108B. The vibration generator 105A and the securing component 107A are respectively the first vibration generator and the first supporting part. The vibration generator 105B and the securing component 107B are respectively the second vibration generator and the second supporting part.

The relationship between the vibration generator 105A, the securing component 107A, and the vibration absorbing component 108A is the same as the relationship between the vibration generator 105, the securing component 107, and the vibration absorbing component 108 described above. Also, the relationship between the vibration generator 105B, the securing component 107B, and the vibration absorbing component 108B is the same as the relationship between the vibration generator 105, the securing component 107, and the vibration absorbing component 108 described above.

In the configuration examples illustrated in FIGS. 14A and 14B, the insulating substrate 102 is in a rectangular shape. The vibration generator 105A is placed near one Y-axis side along the Y-axis of the insulating substrate 102, and extends along the side. The securing component 107A supports the other Y-axis side opposing to that Y-axis side, and extends along the other Y-axis side. The vibration generator 105A and the securing component 107A face each other in the direction along the X-axis across the touch target area not shown in FIG. 14A or 14B.

The vibration absorbing component 108A supports that one Y-axis side. The vibration absorbing component 108A is placed side by side with the vibration generator 105A in the direction along the X-axis at the side opposing to the securing component 107A (touch target area). The vibration absorbing component 108A extends along the Y-axis side.

The vibration generator 105B is placed near one X-axis side along the X-axis of the insulating substrate 102, and extends along the side. The securing component 107B supports the other X-axis side opposing to that X-axis side, and extends along the other X-axis side. The vibration generator 105B and the securing component 107B face each other along the Y-axis across the touch target area.

The vibration absorbing component 108B supports the one X-axis side. The vibration absorbing component 108B is placed side by side with the vibration generator 105B in the direction along the Y-axis at the side opposing to the securing component 107B (touch target area). The vibration absorbing component 108B extends along the X-axis side.

The control device 201 selectively activates the vibration generator 105A and the vibration generator 105B. FIG. 14A illustrates a standing wave 651A generated through the vibration of the vibration generator 105A, and FIG. 14B illustrates a standing wave 651B generated through the vibration of the vibration generator 105B. This way, the tactile presentation device 10 can generate two standing waves which nodes and antinodes are arranged in differing directions. In the state of FIG. 14A, the standing wave 651A with vertical stripes is generated, and in the state of FIG. 14B, the standing wave 651B with horizontal stripes is generated.

The control device 201 activates only one vibration generator depending on the position of the touching finger or displayed image. FIGS. 14A and 14B illustrate a control example for selecting a vibration generator to be activated based on the touch positions of the two fingers 111 and 112. When the distance between the fingers 111 and 112 along the X-axis is larger than the distance thereof along the Y-axis, the control device 201 activates the vibration generator 105A. On the other hand, when the distance between the fingers 111 and 112 along the Y-axis is larger than the distance thereof along the X-axis, the control device 201 activates the vibration generator 105B.

In FIG. 14A, the touch positions of the fingers 111 and 112 are substantially the same along the Y-axis, but slightly differ along the X-axis. The control device 201 activates the vibration generator 105A, and generates a standing wave with vertical stripes. Because the nodes and antinodes of the standing wave are arranged along the X-axis, tactile feedback is presented to only one finger of the fingers 111 and 112 that are at respectively different positions along the X-axis.

In FIG. 14B, the touch positions of the fingers 111 and 112 are substantially the same along X-axis, but slightly differ along the Y-axis. The control device 201 activates the vibration generator 105B, and generates a standing wave with horizontal stripes. Because the nodes and antinodes of the standing wave are arranged along the Y-axis, tactile feedback is presented to only one finger of the fingers 111 and 112 that are at respectively different positions along the Y-axis.

Figure 15:
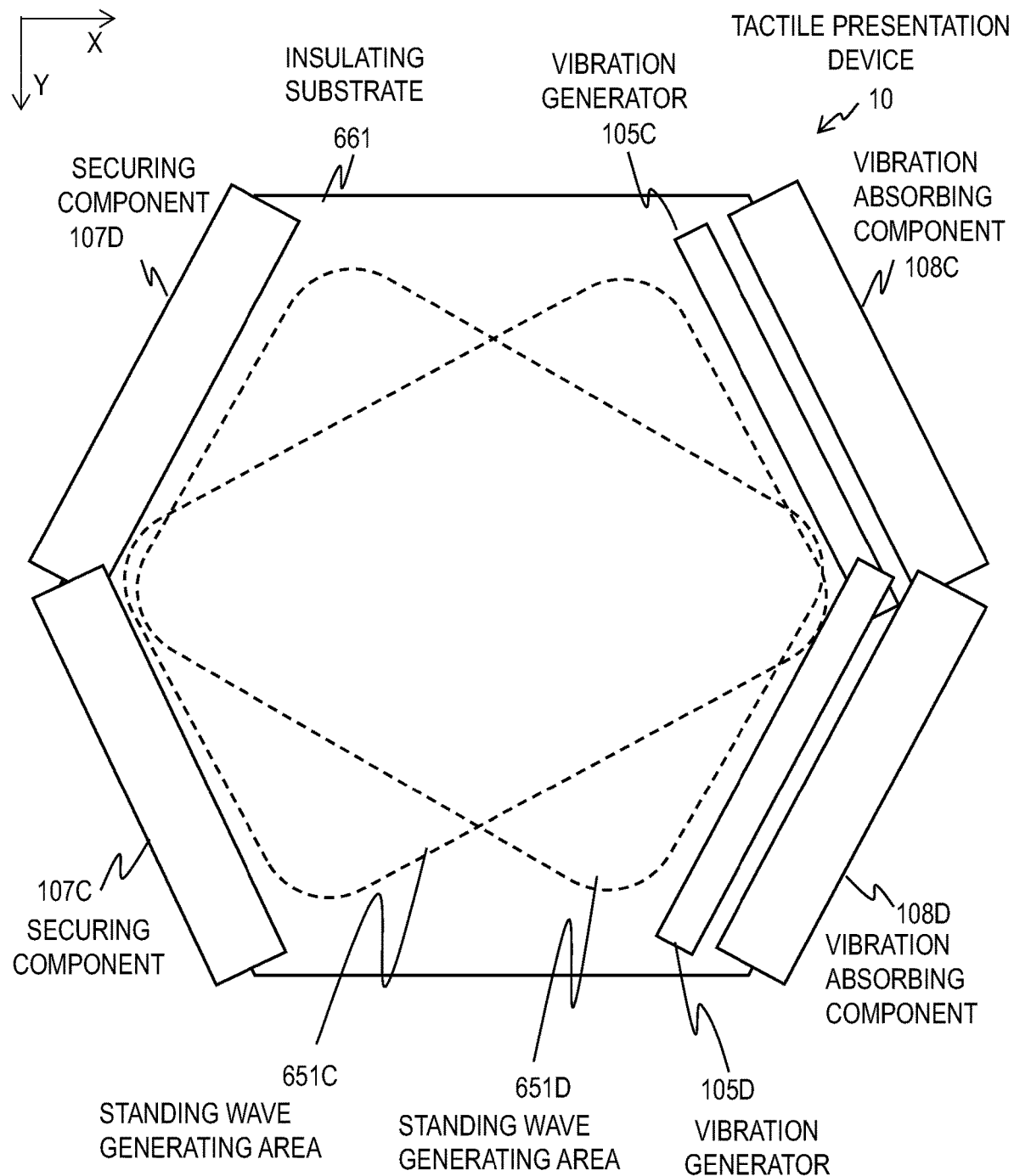
FIG. 15 illustrates the operation of the configuration example of the tactile presentation device according to one embodiment of the present specification.

FIG. 15 illustrates the operation of the configuration example of the tactile presentation device 10 according to one embodiment of the present specification. The tactile presentation device 10 includes two vibration generators 105C and 105D, two securing components 107C and 107D, and two vibration absorbing components 108C and 108D. The vibration generator 105C and the securing component 107C are respectively the first vibration generator and the first supporting part. The vibration generator 105D and the securing component 107D are respectively the second vibration generator and the second supporting part.

The relationship between the vibration generator 105C, the securing component 107C, and the vibration absorbing component 108C is the same as the relationship between the vibration generator 105, the securing component 107, and the vibration absorbing component 108 described above. Also, the relationship between the vibration generator 105D, the securing component 107D, and the vibration absorbing component 108D is the same as the relationship between the vibration generator 105, the securing component 107, and the vibration absorbing component 108 described above.

An insulating substrate 661 is in a hexagonal shape. The vibration generator 105C is placed near the first side of the insulating substrate 661, and extends along the side. The securing component 107C supports the opposing side that is in parallel with the first side, and extends along the opposing side. The vibration generator 105C and the securing component 107C face each other across the touch target area not shown in FIG. 15.

The vibration absorbing component 108C supports the first side. The vibration absorbing component 108C faces the vibration generator 105C on the side opposing to the securing component 107C (touch target area). The vibration absorbing component 108C extends along the first side.

The vibration generator 105D is placed near the second side of the insulating substrate 661, which is adjacent to the first side, and extends along the second side. The securing component 107D supports the opposing side that is in parallel with the second side, and extends along the opposing side. The vibration generator 105D and the securing component 107D face each other across the touch target area.

The vibration absorbing component 108D supports the second side. The vibration absorbing component 108D faces the vibration generator 105D on the side opposing to the securing component 107D (touch target area). The vibration absorbing component 108D extends along the second side.

The control device 201 selectively activates the vibration generator 105C and the vibration generator 105D. When the vibration generator 105C is activated, a standing wave is generated in the standing wave generating area 651C. When the vibration generator 105D is activated, a standing wave is generated in the standing wave generating area 651D. The vector angle of the carrier waves from the vibration generators of the two standing waves is smaller than 90 degrees. This way, the tactile presentation device 10 can generate two standing waves which nodes and antinodes are arranged in differing directions. As explained with reference to FIGS. 14A and 14B, the control device 201 can control the vibration generators 105C and 105D.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A tactile presentation device, comprising:
a panel;
a first supporting member that secures and supports a first end of the panel;
a vibration generator disposed at a position facing the first supporting member across a target area to be touched by a user on the panel; and
a driving control device that provides the vibration generator with a driving signal,
wherein the driving control device makes only the vibration generator vibrate to form a standing wave in an area including the target area between the vibration generator and the first end,
wherein a first vibration reflection rate at the first end for a carrier wave from the vibration generator is negative, and
wherein a second vibration reflection rate for the carrier wave from the vibration generator at a second end of the panel that is a free or an absorption end opposing to the first end across the vibration generator is greater than the first vibration reflection rate.

2. The tactile presentation device according to claim 1, wherein an absolute value of the second vibration reflection rate is smaller than an absolute value of the first vibration reflection rate.

3. The tactile presentation device according to claim 2, further comprising a second supporting member that supports the second end, wherein the elastic modulus of the second supporting member at a part touching the panel is smaller than elastic modulus of the first supporting member at a part touching the panel, and wherein viscosity of the second supporting member at the part touching the panel is smaller than viscosity of the first supporting member at the part touching the panel.

4. The tactile presentation device according to claim 1, wherein the drive control device determines a touch position at which tactile feedback is not presented, among a plurality of positions detected to be touched at the same time on the panel; and drives and controls the vibration generator to generate a standing wave having a node near the touch position at which tactile feedback is not presented.

5. The tactile presentation device according to claim 4, wherein the drive control device selects a standing wave that makes vibration of the vibration generator closest to a reference frequency, among a plurality of standing waves having a node at the touch position at which tactile feedback is not presented, and wherein, at the reference frequency, the carrier wave from the vibration generator and a reflected wave at the second end strengthen each other between the vibration generator and the first end.

6. The tactile presentation device according to claim 5, wherein the second vibration reflection rate is positive, and wherein a distance between a center of the vibration generator and a reflection end at the second end is $(n/2-1/6$ to $n/2+1/6)$ times as long as a wavelength of a standing wave generated by the vibration generator, and n is an integer of 0 or greater.

7. The tactile presentation device according to claim 5, wherein the second vibration reflection rate is negative, and wherein a distance between a center of the vibration generator and a reflection end at the second end is $(n/2+1/12$ to $n/2+5/12)$ times as long as a wavelength of a standing waves generated by the vibration generator, and n is an integer of 0 or greater.

8. The tactile presentation device according to claim 4, wherein the vibration generator includes a first internal vibrator and a second internal vibrator disposed at a position facing the first supporting member across the target area, wherein the first internal vibrator is disposed between the second internal vibrator and the target area, wherein the drive control device selects a standing wave that makes vibration of the vibration generator closest to a reference frequency, among a plurality of standing waves having a node at the touch position at which tactile feedback is not presented, and wherein, at the reference frequency, the carrier wave from the first internal vibrator and a reflected wave at the second end of the second internal vibrator strengthen each other between the vibration generator and the first end.

9. The tactile presentation device according to claim 8, wherein a distance between the first internal vibrator and the second internal vibrator is $(n/2+1/6$ to $n/2+1/3)$ times as long as a wavelength of a standing wave generated by the vibration generator, and n is an integer of 0 or greater.

10. The tactile presentation device according to claim 1, wherein the vibration generator is a first vibration generator, wherein the tactile presentation device further includes a second vibration generator and a second supporting member, wherein the first vibration generator is disposed near a first side of the panel, wherein the second vibration generator is disposed near a side of the panel adjacent to the first side, wherein the second supporting member is disposed at a position facing the second vibration generator across the target area, and wherein the drive control device only drives one of the first vibration generator and the second vibration generator.

* * * * *